(12) United States Patent
Davis

(10) Patent No.: US 6,556,673 B1
(45) Date of Patent: Apr. 29, 2003

(54) TELEPHONE RING SIGNAL DETECTOR

(75) Inventor: William Folsom Davis, Tempe, AZ (US)

(73) Assignee: DASYM Technologies, Inc., Mesa, AZ (US)

( * ) Notice: Subject to any disclaimer, the term of this patent is extended or adjusted under 35 U.S.C. 154(b) by 0 days.

(21) Appl. No.: 09/439,178

(22) Filed: Nov. 12, 1999

(51) Int. Cl.$^7$ ............................................ H04M 1/00
(52) U.S. Cl. .................. 379/377; 379/373.01; 379/382; 379/418
(58) Field of Search ........................... 379/377, 373.05, 379/375.01, 376.02, 382, 413.01, 413.02, 418, 399.01

(56) References Cited

U.S. PATENT DOCUMENTS 5,544,241 A  8/1996  Dibner et al.
5,920,624 A  7/1999  Davis

OTHER PUBLICATIONS

Bellcore, Network Maintenance: Transport Surveillance—Additional Transport and Transport—Based Surveillance, Section 5.2 Issue 1, Jun. 1990 TR–TSY–000821.
Bellcore, Call Processing, Section 5–Issue 3, May 1991 TR–NWT–000505.
Bellcore, Signal for Analog Interfaces Issue1, Jun. 1996 GR–506–CORE.
American National Standards Institute, Inc. Aug. 18, 1993 Interface Between carriers and Customer Installations—Analog Voicegrade Switched Access Lines Using Loop–Start and Ground–Start Signaling. ANSI T1.401–1993.

*Primary Examiner*—Rexford Barnie
(74) *Attorney, Agent, or Firm*—Ingrassia Fisher & Lorenz, P.C.

(57) ABSTRACT

A telephone ring signal detector is coupled to a telecommunication line for detecting a first telephone ring signal, and for discriminating the first telephone ring signal from other line signals on the line. This detector comprises an event generator, coupled to the line, for receiving an incoming signal and for generating an initial event signal and an ending event signal, and a signal characteristic generator, coupled to the line and to the event generator, for generating a signal characteristic of the incoming signal after the initial event signal. This detector further comprises a signal characteristic limit device, for generating a predetermined signal characteristic range limit of the first telephone ring signal, and a signal characteristic comparator coupled to the signal characteristic generator, to the signal characteristic limit device and to the event generator, for comparing the signal characteristic with the predetermined signal characteristic range limit. A valid compare signal is generated when the signal characteristic is within the predetermined signal characteristic range limit. A ring detect signal is generated during the first quarter cycle time period of the first telephone ring signal in response to the valid compare signal and the ending event signal having occurred. The detector further comprises a line impedance device coupled to the signal characteristic comparator and to the line for activating an off-hook condition on the line during the first quarter cycle time period of the first telephone ring signal, in response to the ring detect signal.

20 Claims, 9 Drawing Sheets

TELEPHONE RING SIGNAL DETECTOR

BACKGROUND OF THE INVENTION

This invention relates to telecommunications and, more specifically, to a telephone ring signal detector, which discriminates a telephone ring signal from other signals on a telephone line, and detects the telephone ring signal on the line, during a first quarter cycle of a first ring signal.

In the telephone art, many different electrical voltages are present on a telecommunication line, or a telephone line. The line usually consists of two wires coupled from a Telephone Company Central Office (CO) to at least one telephone device, such as a premise telephone, at a subscriber premise. The CO typically provides a nominal 48 volt direct current (DC) battery voltage between the wires. This provides an electrical interface between the telephone device and the CO, allowing the CO to communicate by electrical signals with the telephone device. During an alerting state, the CO notifies the premise of an incoming telephone call, by transmitting an alternating ring signal voltage between the wires. The ring signal voltage activates an audible alerting device, such as a telephone ringer associated with the premise telephone. The CO may also connect a DC, or an alternating current (AC), telephone line test voltage to the wires, testing for a DC line resistance, or an AC line impedance. These line tests partially insure that the telephone line is in electrical compliance with a Federal Communication Commission (FCC) document, 47 CFR, Part 68. In addition, a high frequency transient voltage can also occur on the line, due to a pulse dialing of the premise telephone. Since telephone ring signal detectors must be unresponsive to line test signals, details of typical line test voltages are next discussed.

The line test voltages generated by the CO include an alternating pre-ring test voltage, which is applied to the line just prior to the first ring signal, and a DC test voltage, which is applied to the line during other routine maintenance periods. Bellcore documents TR-TSY-000821 and TR-NWT-000505 indicate that the CO may activate a per-call subscriber line test on the line, just prior to the first ring signal. The purpose of this pre-ring line test is to detect any excessive voltage on the line and to determine the line impedance between the wires and from each wire to ground. Bellcore document GR-506-CORE further indicates that a Loop Current Feed Open (LCFO) Interval occurs for a time interval including 0.3 seconds. During the LCFO time interval, the nominal CO battery voltage is disconnect from the wires. During the LCFO Interval, each wire may be independently or simultaneously grounded, and a CO battery test voltage may be independently, or simultaneous, applied to each wire with respect to ground. Multiple LCFOs can also occur, separated by at least a 0.1 second time interval when the nominal CO battery voltage is momentarily connected to the wires. An ANSI document T1.401-1993 discusses similar Open Switch Intervals (OSI). When any of these document described tests are applied to the line as the pre-ring line test, the alternating pre-ring voltage can result between the wires. The pre-ring line test can produce a substantial peak pre-ring voltage for a pre-ring test time interval being greater than a quarter cycle time period of the ring signal. According to an Electronic Industries Association EIA-470-A document, the CO can also apply a DC test voltage from 0V to 200V between the wires and from each wire to ground. The purpose of the DC line test is to provide a DC line resistance measurement on a routine basis. Since a DC resistance measurement requires a non-varying voltage, large DC voltages can be applied to the line for a DC test time interval being much greater than the quarter cycle time period of the ring signal. During this routine DC line test, the DC line test voltage may also be switched to and from the wires. For this case, an alternating test voltage is produced across the wires, and having an alternating time period much greater than the quarter cycle time period of the ring signal. In addition, this routine DC line test can produce a peak line test voltage that is comparable to a peak ring signal voltage. Thus, in addition to the nominal 48 DC volts and the ring signal voltage on the line, other line signal voltages include the transient voltage due to pulse dialing, the pre-ring AC line test voltage, and a switched or non-switched DC line test voltage. All of these voltages are possible incoming signals to a telephone ring signal detector coupled to the line. In general, it is desirable for such a ring signal detector to detect the ring signal voltage and to reject all other incoming line signal voltages. Thus such a detector must discriminate the ring signal from other line signals on the line.

Recently, enhanced telephone ring signal detectors have been developed, to provide an automated telephone answering function. These enhanced detectors answer incoming calls without activating any audible ringer mechanisms associated with premise telephones connected to the wires. These enhanced detectors are described in U.S. Pat. No. 5,544,241 to Dibner et. al., on Aug. 6, 1996, in U.S. Pat. No. 5,920,624 to Davis on Jul. 6, 1999, and in patent application Ser. No. 09/096,964 by Davis. These enhanced detectors couple an off-hook terminal impedance to the line, in response to detecting the ring signal, prior to a first quarter cycle time period of a first telephone ring signal. The off-hook impedance is substantially equivalent to a terminal impedance exhibited by a telephone, when a telephone's receiver is removed from a telephone's cradle and hook switch. The CO detects an off-hook condition, due to the off-hook impedance on the line, and terminates the first telephone ring signal voltage. As a result, the ring signal voltage cannot achieve sufficient magnitude or energy to activate any of the audible ringer mechanisms connected to the wires. These enhanced detectors further require that other line signals are discriminated from a ring signal, during a discriminating time interval not to exceed the quarter cycle time period of a ring signal. In addition, the ring signal must be detected during a first quarter cycle time period of a first telephone ring signal.

The detectors described by the U.S. Patents to Dibner and Davis can detect the ring signal prior to the first quarter cycle time period of the first ring signal. However, it is possible for both of these detectors to erroneously detect the pre-ring and switched DC line test voltages as a valid first ring signal voltage. This results when these test voltages exceed the threshold voltages of these detectors, for at least a time interval equal to the quarter cycle time interval of a ring signal. Thus the patented detectors by Dibner and Davis cannot discriminate between line test voltages and a valid first ring signal voltage, during a discriminating time interval equal to the quarter cycle time interval of a ring signal. The detector, described by the Davis application Ser. No. 09/096,964, provides an improvement over the Dibner detector, by generating an adaptive predetermined threshold voltage, which is greater than the peak pre-ring voltage and less than the peak ring signal voltage. As a result, this detector, described by the Davis application, discriminates the pre-ring line test voltage from a first ring signal voltage. However, when the DC test voltage is switched to the line and exceeds the adaptive threshold voltage for at least the quarter cycle time interval of a ring signal, the detector, described in the Davis application, would also erroneously detect the DC line test voltage as a valid first ring signal voltage. Thus the detector, described by the Davis application, cannot discriminate between the switched DC switched line test voltage and a valid first ring signal voltage in the discriminating time interval equal to the quarter cycle time interval of a ring signal.

Hence there is a need for an improved telephone ring signal detector, which can discriminate other line signals, such as the line transient and line test voltages, from a first telephone ring signal voltage. This signal discrimination must occur, during a discriminating time interval being less than the quarter cycle time interval of a ring signal. There is a further need for the improved ring signal detector to be unresponsive to the line transient and line test voltages and to only be responsive to the first telephone ring signal voltage. Given the above needs, the ring signal detection must occur during the first quarter cycle time period of the first telephone ring signal.

SUMMARY OF THE INVENTION

Accordingly, it is an object of the present invention to provide an improved telephone ring signal detector.

It is a further object of the present invention to provide an improved telephone ring signal detector, which discriminates other line signals from a first telephone ring signal on a telecommunication line, where other line signals include an alternating pre-ring line test voltage, an alternating line test voltage due to a switched DC line test voltage, and a high frequency transient voltage, due to pulse dialing of a premise telephone.

It is another object of the present invention to provide an improved telephone ring signal detector, which discriminates other line signals from a first telephone ring signal on a telecommunication line, during a discriminating time interval being less than a quarter cycle time interval of a telephone ring signal.

It is a still further object of the present invention to provide an improved telephone ring signal detector, which is unresponsive to other line signals on a telecommunication line, yet being responsive to a first telephone ring signal on the telecommunication line, during a first quarter cycle time period of a first telephone ring signal.

It is yet another object of the present invention to provide an improved telephone ring signal detector, which is unresponsive to other line signals on a telecommunication line, yet couples an off-hook terminal impedance to a telecommunication line, during a first quarter cycle time period of a first telephone ring signal.

According to one aspect of the present invention, there is provided a telephone ring signal detector coupled to a telecommunication line for detecting a first telephone ring signal on a telecommunication line, and discriminating the first telephone ring signal from other line signals on the telecommunication line. The telephone ring signal detector comprises an event generator coupled to the telecommunication line, for receiving an incoming signal and for generating an initial event signal and an ending event signal. The telephone ring signal detector further comprises a signal characteristic generator, coupled to the telecommunication line and to the event generator, for generating a signal characteristic of the incoming signal after the initial event signal. The telephone ring signal detector further comprises a signal characteristic limit device, for generating a predetermined signal characteristic range limit of the first telephone ring signal, and a signal characteristic comparator, coupled to the signal characteristic generator, to the signal characteristic limit device, and to the event generator, for comparing the signal characteristic with the predetermined signal characteristic range limit. The signal characteristic comparator generates a valid compare signal in response to the signal characteristic being within the predetermined signal characteristic range limit. The signal characteristic comparator also generates a ring detect signal, during the first quarter cycle time period of the first telephone ring signal, in response to the valid compare signal and the ending event signal having occurred.

According to a second aspect of the present invention, the telephone ring signal detector further comprises a line impedance device for providing an off-hook terminal impedance. The line impedance device is coupled to the telecommunication line and to the signal characteristic comparator for coupling the off-hook terminal impedance to the telecommunication line in response to the ring detect signal. As a result, an off-hook condition on the telecommunication line occurs during the first quarter-cycle time period of the first telephone ring signal.

The above and other objects, features and advantages of the present invention will be more clearly understood from the following detailed description taken in conjunction with the accompanying drawings, in which

DETAILED DESCRIPTION OF THE DRAWINGS

During an alerting state, a telephone ring signal is transmitted from a Telephone Company Central Office (CO), to a telephone subscriber premise on a telephone line. The ring signal activates an alerting device, such as a telephone ringer, at the premise. A telephone ring signal voltage is typically an approximate sinusoidal voltage, having a ring signal cycle time period (Tp), a quarter cycle time period (0.25 Tp) and a peak ring signal voltage (Vp). The ring signal voltage is transmitted between a Tip wire and a Ring wire of the line, producing a Tip-to-Ring voltage (Vtr) on the line. A first telephone ring signal is a first telephone ring signal voltage, being a first approximate sinusoidal voltage waveform, during the alerting state. Voltage Vtr can also have other voltage components, due to other line signals, including a pulse dialing signal, a pre-ring line test signal, and a routine maintenance line test signal. All of these signals are incoming signals to any ring signal detector coupled to the line.

Figure 1:
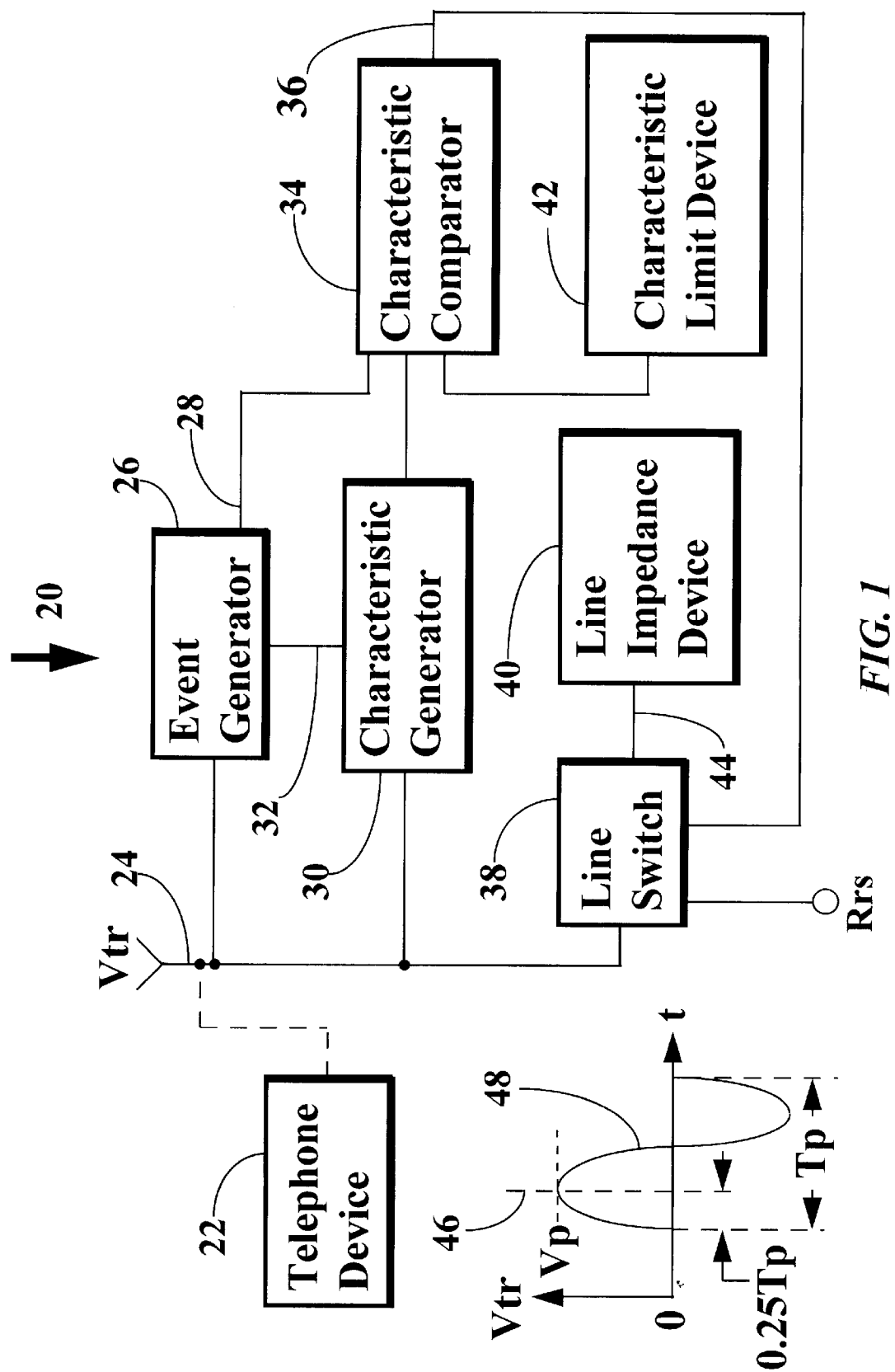
FIG. 1 shows a block diagram of an inventive telephone ring signal detector coupled to a telecommunications line and a telephone device connectable to the line.

FIG. 1 shows a telephone ring signal detector 20, being the inventive subject of this application, coupled to a telecommunication line 24, such as the telephone line. Detector 20 receives an incoming signal, such as a first telephone ring signal, being a first telephone ring signal voltage 48 of voltage Vtr on line 24. A telephone device 22, such as a telephone, is also shown to be connectable in parallel with detector 20 and to line 24. In addition, a voltage Vtr vs. time waveform is shown, demonstrating voltage 48 as a first telephone ring signal, having voltage Vp, a first quarter cycle time period (0.25 Tp), and a first quarter cycle time 46 of the first telephone ring signal.

Detector 20 comprises a signal characteristic generator 30, an event generator 26, a signal characteristic comparator 34, a signal characteristic limit device 42, a line switch 38, and a line impedance device 40. Line 24 is coupled to receive voltage Vtr as the incoming signal. A signal input of generator 30 is coupled to line 24, and a characteristic output of generator 30 is coupled to a characteristic input of comparator 34. Event generator 26 has a signal input coupled to line 24 and an ending event output coupled to an ending event input of comparator 34, by an ending event line 28. Generator 26 also has a signal event output coupled to a signal event input of generator 30, by a signal event line 32. The signal event output of generator 26 could also be alternatively comprised of more than one output, and the signal event input of generator 30 could be alternatively comprised of more than one corresponding input. Limit device 42 has a limit output coupled to a limit input of comparator 34. The limit output of device 42 could also be alternatively comprised of more than one output, and the limit input of comparator 34 could be alternatively comprised of more than one corresponding input. A comparator output of comparator 34 is coupled to a control input of switch 38, by a ring signal detect output line 36. A line input of switch 38 is coupled to line 24, and a line output of switch 38 is coupled to impedance device 40, by a line 44. Switch 38 also has a reset input terminal (Rrs). The detection of the first ring signal voltage 48, by detector 20, is next described.

In general, detector 20 detects ring signal voltage 48, during the first time period 0.25 Tp and prior to time 46. Detector 20 generates a signal characteristic of incoming signal voltage 48, and compares the signal characteristic of voltage 48 with a predetermined signal characteristic range limit of voltage 48, during a signal discriminating time interval (Td). This discriminating time interval is less than time period 0.25 Tp, and occurs prior to the quarter cycle time 46. During time interval Td, when the signal characteristic is within the characteristic range limit, a valid compare signal is generated. The valid compare signal occurs immediately when the signal characteristic is within the characteristic range limit, or alternatively, after a substantial time interval, when the signal characteristic is within the characteristic range limit. In general, the valid compare signal occurs in response to the signal characteristic being within the characteristic range limit. A ring detect signal is outputted in response to the valid compare signal and time interval Td having occurred, during the first time period 0.25 Tp and prior to time 46. A ring detect signal is a signal which indicates a presence of a valid telephone ring signal voltage, such as voltage 48, on line 24. In response to the ring detect signal, an off-hook terminal impedance is coupled to line 24. The off-hook terminal impedance is a terminal impedance exhibited by a subscriber telephone, when the telephone's receiver is removed from a telephone's cradle and hook switch. However, the off-hook impedance can alternatively include magnitudes as low as zero ohms in some embodiments. The function of detector 20 is next discussed in even further detail.

More specifically, event generator 26 receives voltage 48 as an incoming signal on line 24, and outputs an initial event signal on line 32 at an initial time (Ti) in response to detecting a predetermined signal magnitude of voltage 48. The initial event signal occurs prior to time 46. Generator 26 also outputs an ending event signal on line 28 at a final time (Tf), after time Ti and prior to time 46. Alternatively, generator 26 may also output the ending event signal on line 32 as well as on line 28. The ending event signal is in response to a signal magnitude of voltage 48 being greater than the predetermined signal magnitude of voltage 48, by a predetermined signal magnitude difference. Alternatively, the ending event signal is generated when a predetermined time interval has elapsed from when the initial event signal having occurred.

Characteristic generator 30 also receives signal voltage 48 as an incoming signal on line 24 as well as at least the initial event signal on line 32. In response to these signals, generator 30 generates a signal characteristic of voltage 48, after the initial event signal. Although not necessary for ring signal detection, the signal characteristic is alternatively terminated in response to the ending event signal on line 32 at time Tf. The discriminating time interval is the time duration between the initial and ending event signals, or time interval Td=(Tf−Ti). Generator 30 outputs the signal characteristic to the signal characteristic input of comparator 34, during time interval Td.

Device 42 outputs a predetermined signal characteristic limit of voltage 48 at the limit output, during time interval Td. As a result of the signal characteristic limit, device 42 provides a predetermined signal characteristic range limit of voltage 48. This range limit is a range of permissible signal characteristics of voltage 48, bounded by the signal characteristic limit of voltage 48. The signal characteristic limit is dynamic, meaning the characteristic limit is a function of time, or alternatively, the signal characteristic limit is static, meaning the characteristic limit is a constant, independent of time. Thus the resulting signal characteristic range limit is also either dynamic or static.

Comparator 34 receives the signal characteristic of voltage 48 at the comparator's characteristic input, and receives the signal characteristic limit of voltage 48 at the comparator's limit input. Comparator 34 generates the valid compare signal in response to the signal characteristic being within the predetermined signal characteristic range limit, during time interval Td. The valid compare signal can occur immediately, when the signal characteristic is within the predetermined signal characteristic range limit, or alternatively, when the signal characteristic is within the predetermined signal characteristic range limit, for a substantial time interval including time interval Td. Comparator 34 outputs the ring detect signal on line 36, in response to the valid compare signal and the ending event signal having occurred. Since the ending event signal occurs prior to time 46, the ring detect signal occurs, during the first quarter cycle time period of the first telephone ring signal. There are many signal characteristics which can be utilized by detector 20.

Examples of signal characteristics of the incoming signal include a voltage or current characteristic, a derivative characteristic, an integral characteristic, and a set of Fourier Transform characteristic coefficients generated from the incoming signal. In addition, an approximate voltage vs. time slope characteristic of the incoming signal can be defined by two voltage vs. time magnitudes, when the initial and ending event signals respectively occur. Each of these signal characteristics can be a representation. For example, a voltage integral characteristic is a signal characteristic of a signal voltage. However, the voltage integral characteristic can be represented in many alternate forms, including a current integral, accumulated charge on a capacitor as a function of time, or a digital magnitude as a function of time. As another example, a slope characteristic of the incoming signal can be represented by a peak voltage on a capacitor. Thus characteristic representations of the incoming signal for this invention include an integral representation, a derivative representation, a voltage or current representation, and a slope representation.

Detector 20 further couples the off-hook terminal impedance of impedance device 40 to line 24 prior to time 46, in response to the ring detect signal. Specifically, the control input of switch 38 detects the ring detect signal on line 36, causing the line input of switch 38 to be coupled to the line output of switch 38. Thus line 24 is coupled to line 44 and to impedance device 40, in response to the ring detect signal. Since a terminal impedance of device 40 is the off-hook terminal impedance, then the off-hook impedance is also coupled to line 24, in response to the ring detect signal. This provides an off-hook condition on line 24, during time period 0.25 Tp of voltage 48. Alternatively, switch 38 is incorporated into device 40 (not shown), coupling the off-hook terminal impedance of device 40 to line 24, in response to the ring detect signal being coupled to device 40. The off-hook condition occurs on line 24, when the off-hook impedance is coupled to line 24. When the CO detects the off-hook condition on line 24, the CO terminates the ring signal voltage, before it can achieve sufficient magnitude or energy to activate any audible ringer mechanisms connectable to line 24, at the premise. For example, when device 22 has an audible ringer mechanism coupled to line 24, detector 20 will provide the off-hook impedance on line 24, and the CO will terminate the ring signal before the ringer mechanism of device 22 is activated. After terminating the ring signal, the CO provides a communication state on line 24, between the CO and detector 20.

During the communication state on line 24, telecommunication line signals are transmitted and received, between detector 20 and the CO. These telecommunication signals include voice, dual tone multi-frequency (DTMF), and data signals. Since telecommunication signals on line 24 are coupled to line 44 through switch 38, telecommunication signals can be transmitted or received, by other electronic devices couple to line 44, or to and through impedance device 40. When device 22 is coupled to line 24, device 22 can also communicate with the CO, using similar telecommunication signals on line 24, during the communication state. When a reset signal is applied to terminal Rrs of switch 38, line 44 is uncoupled from line 24, which terminates the off-hook impedance from line 24. This reset signal can be applied to generator 30, generator 26, comparator 34 and device 42, to reset and prepare detector 20 for subsequent ring signal detection. Ring signal detection by detector 20 will be more clearly understood, with the following description of the voltage waveforms of FIG. 2.

Figure 2:
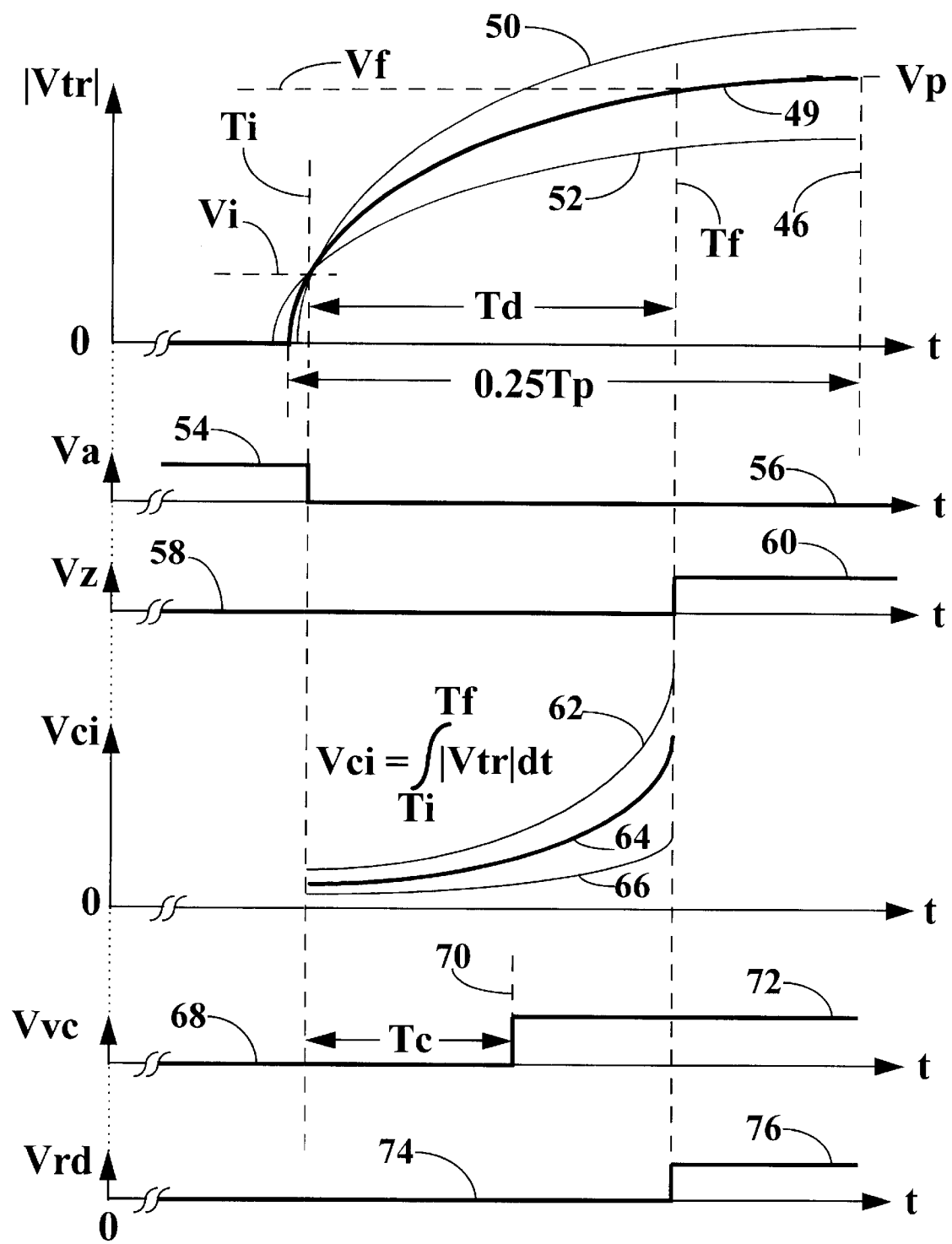
FIG. 2 demonstrates waveforms of a magnitude of a first telephone ring signal voltage and associated voltage limits, during a first quarter cycle time period of a first ring signal. Voltage waveforms of logic signals and an integral signal characteristic is also shown for the detector shown in FIG. 1, during the detection of a first ring signal.

The waveforms of FIG. 2 are associated with detector 20 of FIG. 1, when detecting voltage 48 prior to time 46. All waveforms are shown as a function of time (t), during the first time period 0.25 Tp of the first ring signal. A magnitude of voltage Vtr is a magnitude voltage (|Vtr|). Thus the waveform of voltage |Vtr| shows a nominal magnitude voltage 49, which is a nominal magnitude of voltage 48. A maximum magnitude limit voltage 50 is a maximum magnitude of voltage 48, and a minimum magnitude limit voltage 52 is a minimum magnitude of voltage 48. The variance of voltage 48, causing variance in voltage 49 between voltages 50 and 52, is well known and thus predetermined. An initial event logic voltage (Va) is an initial event voltage associated with an initial event signal 56. An ending event logic voltage (Vz) is an ending event voltage associated with an ending event signal 60. A valid compare logic voltage (Vvc) is a valid compare voltage associated with a valid compare signal 72. A ring signal detect logic voltage (Vrd) is a ring signal detect voltage associated with a ring detect signal 76. An integral voltage (Vci) is an integral voltage of the magnitude of the incoming signal voltage 48, as derived from an integration of voltage 49. The waveform of voltage |Vtr| is generated, by characteristic generator 30 and by event generator 26. Alternatively, generator 30 generates voltage |Vtr|, and generator 26 is coupled to generator 30 to receive voltage |Vtr|, or be responsive to voltage |Vtr|. In another alternative configuration, generator 26 generates voltage |Vtr|, and generator 30 is coupled to generator 26 to receive voltage |Vtr|, or be responsive to voltage |Vtr|. Signal 56 occurs at time Ti, and is outputted by generator 26 on line 32. Signal 60 occurs at time Tf, and is outputted by generator 26 on line 28. Alternatively, signal 60 is outputted by generator 26 on lines 28 and 32. Voltage Vci is generated and outputted by generator 30 after time Ti, demonstrating a nominal integration of voltage 49 as a nominal voltage integral signal characteristic 64. In addition, a predetermined maximum voltage integral signal characteristic limit 62 and a predetermined minimum voltage integral signal characteristic limit 66 are shown, corresponding to an integration of voltages 50 and 52 respectively. Signals 72 and 76 are both generated by comparator 34, with signal 76 occurring on line 36. Ring signal detection will be more clearly understood for detector 20 with the following discussion.

For ring signal detection, the waveforms of FIG. 2, in conjunction with detector 20 of FIG. 1, is next discussed. Prior to time Ti, voltage |Vtr| is less than a predetermined initial voltage (Vi). Thus a reset signal 54 is outputted by generator 26, to provide in an initial reset state for detector 20, prior to time Ti. When voltage 49 exceeds voltage Vi in response to incoming signal voltage 48, generator 26 detects voltage 49 as being at voltage Vi, and outputs signal 56 at time Ti. Thus the initial event signal 56 is generated, in response to detecting the incoming signal voltage 48, having a predetermined signal magnitude of voltage Vi. Signal 56 is a binary low voltage, and signal 54 is a binary high voltage. In response to signal 56, generator 30 generates an integration of voltage 49, after signal 56, as shown by characteristic 64. Thus a signal characteristic 64 of signal voltage 48 is generated, after the initial event signal 56. When voltage 49 exceeds a predetermined final voltage (Vf) in response to incoming signal voltage 48, generator 26 outputs signal 60 at time Tf, and after time Ti. Thus the ending event signal 60 occurs, when the magnitude of voltage 48 is greater than voltage Vi, by a predetermined signal magnitude voltage difference. In this case, the voltage magnitude difference is equal to voltage (Vf−Vi). Signal 60 is a binary high voltage, and a signal 58 is a binary low voltage. For this case, signal 58 indicates voltage |Vtr| is less than voltage Vf, and signal 60 indicates voltage |Vtr| is greater than voltage Vf. Time interval Td is defined by the time interval between times Ti and Tf, or time interval Td=(Tf−Ti). Alternatively, signal 60 is generated at time Tf, by employing generator 26 to add time interval Td to time Ti, such that time Tf=(Ti+Td). In this case, time interval Td is predetermined, and voltage Vf represents the magnitude of voltage 49 at time Tf. For this case, signal 58 indicates time interval Td has not yet occurred, and signal 60 indicates that time interval Td has occurred. Thus ending event signal 60 is generated, when the predetermined time interval Td has elapsed from when the initial event signal 56 has occurred. In general, times Ti and Tf both occur prior to time 46. Thus time interval Td occurs prior to time 46, and time interval Td is less than time interval 0.25 Tp. Generator 30 generates characteristic 64 during time interval Td, and outputs characteristic 64 at the characteristic input of comparator 34. Limit device 42 outputs maximum limit 62 and minimum limit 66 at the maximum and minimum characteristic inputs, respectively, of comparator 34. As a result of limits 62 and 66, device 42 provides a predetermined voltage integral signal characteristic range limit, being less than limit 62 and greater than limit 66. During time interval Td, comparator 34 compares characteristic 64 to limits 62 and 66. When characteristic 64 is within the integral characteristic range limit, for a predetermined confidence time interval (Tc), signal 72 occurs at a time 70 and remains present. Characteristic 64 is within the integral range limit, when characteristic 64 is less than limit 62 and greater than limit 66. Signal 72 is a binary high voltage, and a signal 68 is a binary low voltage. Signal 68 indicates characteristic 64 has not been within the integral range limit, for the complete time interval Tc, after time Ti. Signal 72 indicates characteristic 64 has been within the integral characteristic range limit, for the complete time interval Tc, after time Ti. Time interval Tc provides a time period in which characteristic 64 is continuously compared to characteristic limits 62 and 66. This insures that characteristic 64 is continuously within the integral characteristic range limit, during time interval Tc, providing confidence that characteristic 64 is due to signal 48. Alternatively, time interval Tc can be zero time, meaning signal 72 occurs immediately after time Ti, when characteristic 64 is within the integral characteristic range limit. Alternatively, time interval Tc can be equal to time interval Td, meaning signal 72 occurs immediately after time Tf, when characteristic 64 is continuously within the integral characteristic range limit, during the entire time interval Td. In general, the valid compare signal 72 is generated in response to the signal characteristic 64 being within the integral characteristic range limit. Comparator 34 outputs ring detect signal 76 on line 36, during time period 0.25 Tp and prior to time 46, in response to signals 60 and 72 having both occurred. Although FIG. 2 indicates signal 76 occurs immediately after signals 60 and 72 have occurred, signal 76 can alternately be delayed in time, by one skilled in the art. Thus alternatively, signal 76 occurs substantially after signals 60 and 72 having occurred. Signal 76 is a binary high voltage, and a signal 74 is a binary low voltage. Signal 76 indicates the presence of a first valid ring signal on line 24, and signal 74 indicates the absence of a valid ring signal on line 24. Thus the ring detect signal 76 is generated, during the first time period 0.25 Tp for voltage 48, when the valid compare signal 72 and ending event signal 60 have occurred. A first embodiment of one aspect of detector 20 is shown in FIG. 3, and is next discussed.

Figure 3:
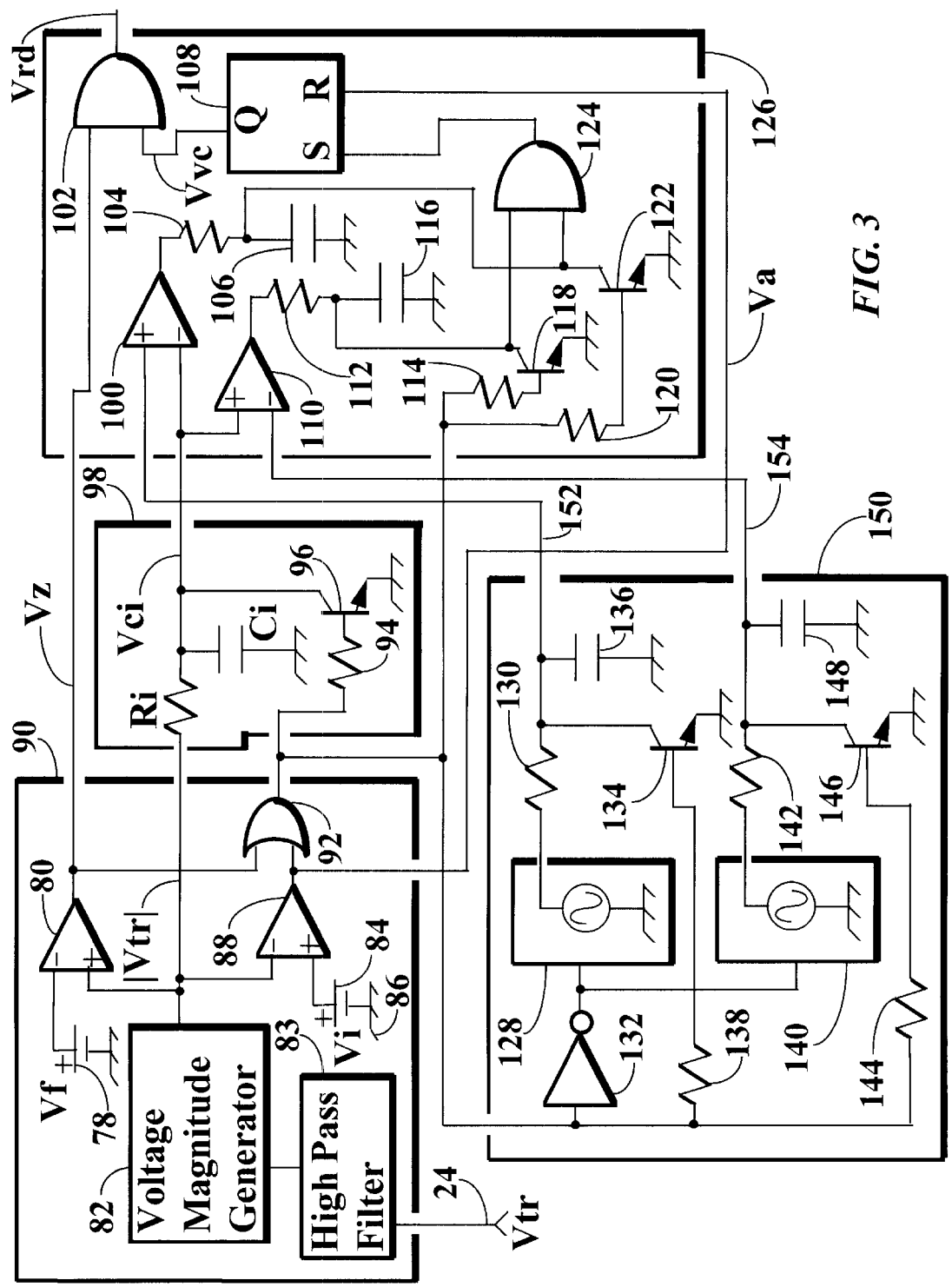
FIG. 3 illustrates a partial block and circuit diagram of a first embodiment of one aspect of the detector of FIG. 1, employing analog circuit techniques and an integral signal characteristic to detect a first ring signal, during a first quarter cycle of the first ring signal.

FIG. 3 shows a first embodiment of one aspect of detector 20, to detect voltage 48 prior to time 46, employing time continuous analog techniques to generate waveforms shown in FIG. 2. In general, this embodiment utilizes a voltage integral characteristic of voltage |Vtr|, to discriminate the ring signal voltage 48 from other line signal voltages on line 24. This first embodiment comprises an event generator 90, a signal characteristic generator 98, a signal characteristic comparator 126, and a signal characteristic limit device 150 for detecting voltage 48. The circuit connections for each electrical device of this first embodiment is next discussed.

Generator 90 comprises a high pass filter 83, a voltage magnitude generator 82, an initial comparator 88, an initial voltage source 84 having a predetermined initial voltage Vi, a final comparator 80, a final voltage source 78 having a predetermined final voltage Vf, and an OR gate 92. An input of filter 83 is coupled to a signal input of generator 90 and to line 24, for receiving voltage Vtr as an incoming signal. An output of filter 83 is coupled to an input of generator 82. An output of generator 82 provides voltage |Vtr|, and is coupled to a positive input of comparator 80, a negative input of comparator 88 and to a signal output of generator 90. A positive terminal of source 84 is coupled to a positive input of comparator 88, and a negative terminal of source 84 is coupled to a ring signal detector ground 86. A positive terminal of source 78 is coupled to a negative input of comparator 80, and a negative terminal of source 78 is coupled to ground 86. An output of comparator 80 provides' voltage Vz and is coupled to a first input of gate 92 and an ending event output of generator 90. The output of comparator 88 provides voltage Va and is coupled to a second input of gate 92 and an initial event output of generator 90. An output of gate 92 is coupled to a reset control output of generator 90.

Generator 98 comprises a base resistor 94, a reset transistor 96, and an analog integrator, further comprising an integrator resistor (Ri) and an integrator capacitor (Ci). A reset control input of generator 98 is coupled to resistor 94. Resistor 94 is coupled to a base of transistor 96, having an emitter coupled to ground 86. A signal input of generator 98 is coupled to an input of the analog integrator at resistor Ri. A characteristic output of generator 98 provides voltage characteristic Vci, and is coupled to resistor Ri, to capacitor Ci, and to a collector of transistor 96. Capacitor Ci is also coupled to ground 86.

Device 150 comprises a maximum voltage limit sine wave generator 128, a reset transistor 134, a base resistor 138, an inverter 132, a minimum voltage limit sine wave generator 140, a reset transistor 146, and a base resistor 144. Device 150 further includes a maximum voltage integrator, comprising an integrator resistor 130 and an integrator capacitor 136. In addition, a minimum voltage integrator is provided, comprising an integrator resistor 142 and an integrator capacitor 148. An input of inverter 132 is coupled to a reset control input of device 150 and to resistors 138 and 144. The output of inverter 132 is coupled to an input of generator 128 and to an input of generator 140. An output of generator 128 is coupled to resistor 130, and an output of generator 140 is coupled to resistor 142. A maximum limit output line 152 is coupled to the maximum limit output of device 150, which provides maximum limit characteristic 62. Line 152 is further coupled to resistor 130, to a collector of transistor 134, and to capacitor 136, which is also coupled to ground 86. An emitter of transistor 134 is coupled to ground 86, and a base of transistor 134 is coupled to resistor 138. A minimum limit output line 154 is coupled to a minimum limit output of device 150, which provides minimum characteristic limit 62. Line 154 is further coupled to resistor 142, to a collector of transistor 146, and to capacitor 148, which is coupled to ground 86. An emitter of transistor 146 is coupled to ground 86, and a base of transistor 146 is coupled to resistor 144.

Comparator 126 comprises an AND gate 102, an AND gate 124, an RS flip-flop 108, a resistor 114, a resistor 120, a reset transistor 118, a reset transistor 122, a maximum limit comparator 100, a maximum limit low pass filter comprising a resistor 104 and a capacitor 106, a minimum limit comparator 110, and a minimum limit low pass filter comprising a resistor 112 and a capacitor 116. A positive input of comparator 100 is coupled to a maximum limit input of comparator 126; A negative input of comparator 110 is coupled to a minimum limit input of comparator 126. A negative input of comparator 100 is coupled to a positive input of comparator 110 and to a signal characteristic input of comparator 126. An output of comparator 100 is coupled to resistor 104, and an output of comparator 110 is coupled to resistor 112. A first input of gate 124 is coupled to resistor 112, to capacitor 116, and to a collector of transistor 118. A second input of gate 124 is coupled to resistor 104, to capacitor 106 and to a collector of transistor 122. Capacitors 106 and 116 are both coupled to ground 86. Resistor 114 is coupled to resistor 120 and to a reset control input of comparator 126. Resistor 114 is coupled to a base of transistor 118, having an emitter coupled to ground 86. Resistor 120 is coupled to a base of transistor 122, having an emitter coupled to ground 86. A Reset (R) input of flip-flop 108 is coupled to an initial reset control input of comparator 126. A Set (S) input of flip-flop 108 is coupled to an output of gate 124. A Q output of flip-flop 108 provides voltage Vvc, and is coupled to a first input of gate 102. A second input of gate 102 is coupled to an ending event input of comparator 126. An output of gate 102 provides voltage Vrd, and is coupled to an output of comparator 126 and to line 36.

Generators 90 and 98, limit device 150, and comparator 126 are also interconnected. The signal output of generator 90 is coupled to the signal input of generator 98. The initial event output of generator 90 is coupled to the initial reset control input of comparator 126. The ending event output of generator 90 is coupled to the ending event input of comparator 126. The signal characteristic output of generator 98 is coupled to the signal characteristic input of comparator 126. The maximum limit input of comparator 126 is coupled to the maximum limit output of device 150, by line 152. The minimum limit input of comparator 126 is coupled to the minimum limit output of device 150, by line 154. The initial event output of generator 90 is coupled to the initial reset control input of comparator 126. The reset control output of generator 90 is coupled to the reset control input of device 150, to the reset control input of generator 98, and to the reset control input of comparator 126. The function of each circuit device and interconnections to detect voltage 48 is next discussed.

Generators 90 and 98, limit device 150, and comparator 126 generates the voltage waveforms of FIG. 2, to detect voltage 48 during time period 0.25 Tp, prior to time 46. Signals 54 and 56 are associated with voltage Va, and signals 58 and 60 are associated with voltage Vz. Signals 68 and 72 are associated with voltage Vvc, and signals 74 and 76 are associated with voltage Vrd. During an incoming signal, filter 83 receives the incoming signal as voltage Vtr on line 24, and provides a high pass filtered output to the input of generator 82. Filter 83 passes ring signal frequencies, but attenuates all other lower frequency signals. Generator 82 generates a magnitude of voltage Vtr, or voltage |Vtr|, and outputs voltage |Vtr| to the inputs of comparators 80 and 88 and to the signal input of generator 98 at resistor Ri. When voltage |Vtr| is less than voltage Vi, the detector of FIG. 3 is in an initial reset state.

During the initial reset state, comparator 88 outputs signal 54, and comparator 80 outputs signal 58, since voltage |Vtr| is less than both voltages Vi and Vf. Signal 54 resets flip-flop 108, causing the Q output of flip-flop 108 to provide signal 68 at the first input of gate 102. Thus gate 102 outputs signal 74 on line 36, during the initial reset state. Also, in response to signal 54, gate 92 outputs a reset control signal as a high logic voltage, during the initial reset state. As a result, resistors 94, 138, 144, 114 and 120 all provide base current to transistors 96, 134, 146, 118, and 122 respectively. This causes these transistors to discharge capacitors Ci, 136, 148, 116 and 106, respectively, to an initial capacitor reset voltage of approximately zero volts. Since low logic voltages occur at the inputs of gate 124 during the initial reset state, gate 124 provides a low logic voltage at the Set (S) input of flip-flop 108. In addition, inverter 132 provides low logic voltage at the inputs of generators 128 and 140, causing generators 128 and 140 to output approximately zero volts, during the initial reset state. The reset state is terminated when voltage |Vtr| exceeds voltage Vi, and a signal characteristic is generated, as is next discussed.

When voltage |Vtr| of voltage 48 equals or exceeds voltage Vi at time Ti, comparator 88 detects voltage Vi, and in response, outputs signal 56 at time Ti. Thus the initial event signal 56 is generated, in response to detecting the incoming signal voltage 48, having a predetermined signal magnitude of voltage Vi. Signal 56 is applied to the Reset (R) input of flip-flop 108 and to the second input of gate 92. After time Ti and during time interval Td when voltage |Vtr| is less than voltage Vf, comparator 80 outputs voltage Vz as signal 58. Since signals 56 and 58 are both present at the inputs of gate 92, gate 92 outputs a low logic voltage at the reset control output of generator 90. This causes transistors 96, 134, 146, 118 and 122 to become non-conductive after time Ti. As a result, capacitors Ci, 136, 148, 116 and 106 become chargeable after time Ti. Thus after time Ti, resistor Ri and capacitor Ci integrates voltage |Vtr|, generating a voltage integral characteristic Vci of voltage |Vtr|. When voltage Vtr is voltage 48, voltage |Vtr| is voltage 49, and the voltage integral characteristic is characteristic 64 as shown in FIG. 2. Thus signal characteristic 64 of the incoming signal 48 is generated after the initial event signal 56. The generation of the characteristic limits is next discussed.

Characteristic limits are generated in response to the reset control signal being a low logic voltage after time Ti.

Inverter 132 provides a high logic voltage at the input of generators 128 and 140, activating each generator to output a sinusoidal voltage waveform. Generator 128 outputs a predetermined maximum waveform of voltage 50, and generator 140 outputs a predetermined minimum waveform of voltage 52. Thus resistor 130 and capacitor 136 integrates voltage 50, providing the maximum voltage integral characteristic limit 62 on line 152, after time Ti. Resistor 142 and capacitor 148 integrates limit voltage 52, providing the minimum voltage integral characteristic limit 66 on line 154 after time Ti. Thus device 150 provides a predetermined voltage integral signal characteristic range limit of voltage 48, being less than limit 62 and greater than limit 66, after time Ti. The signal characteristic is compared to the characteristic limits in the following discussion.

After time Ti, comparator 100 outputs a high logic voltage, when characteristic 64 is less than limit 62 on line 152. After time Ti, comparator 110 outputs a high logic voltage, when characteristic 64 is greater than limit 66 on line 154. The low pass filters, associated with resistor 104 and capacitor 106 and with resistor 112 and capacitor 116, improves the confidence level that characteristic 64 is due to voltage 48. When comparator 100 outputs a high logic voltage for time interval Tc, resistor 104 and capacitor 106 allow a high logic voltage to occur at the second input of gate 124, after time interval Tc. When comparator 110 outputs a high logic voltage for time interval Tc, resistor 112 and capacitor 116 allow a high logic voltage to occur at the first input of gate 124, after time interval Tc. Thus when characteristic 64 is within the integral range limit of voltage 48 during time interval Tc, a high logic voltage occurs at the output of both low pass filters, after time interval Tc. Thus the high logic voltage at both inputs of gate 124 causes a high logic voltage at the Set (S) input of flip-flop 108. As a result, the Q output of flip-flop 108 outputs voltage Vvc as signal 72 at time 70, after time interval Tc. Thus the valid compare signal 72 is generated, in response to the signal characteristic 64 being within the integral characteristic range limit of voltage 48. The generation of the ending event signal and the ring detect signal is next discussed.

When an incoming voltage as voltage |Vtr| exceeds voltage Vf at time Tf, such as when voltage 49 due to voltage 48 exceeds voltage Vf at time Tf, comparator 80 outputs signal 60 for voltage Vz. Signal 60 occurs at the second input of gate 102 and at the first input of gate 92. Since voltages Vi and Vf are predetermined, the ending event signal 60 occurs when the magnitude of voltage 48 is greater than voltage Vi, by a predetermined signal magnitude voltage difference equal to (Vf−VI). Since signals 60 and 72 have both occurred, and are both present at the inputs of gate 102 at time Tf, gate 102 outputs the ring detect signal 76 for voltage Vrd on line 36 at time Tf. Thus the ring detect signal 76 is generated, during time period 0.25 Tp for voltage 48, in response to the valid compare signal 72 and the ending event signal 60 having occurred. Since signal 60 also occurs at the first input of gate 92 at time Tf, gate 92 outputs the reset control signal as a high logic voltage at the reset control output of generator 90 at time Tf. In response to this high logic voltage, capacitors Ci, 136, 148, 116, and 106 are reset to approximately zero volts at time Tf. Thus signal characteristic 64 is terminated in response to ending event signal 60, since the voltage on capacitor Ci is reset. For this embodiment, voltage integral characteristic 64 is reset at time Tf, by the ending event signal 60. However, it is not necessary to reset signal characteristic 64, in response to the ending event signal, in order to detect voltage 48 prior to time 46. After time Tf, this first embodiment enters into the reset state, in response to voltage |Vtr|, as is next discussed.

After time Tf, when voltage |Vtr| decreases less than voltage Vf, or when voltage 49 due to voltage 48 decreases less than voltage Vf, comparator 80 outputs a low logic voltage similar to signal 58 at the second input of gate 102. As a result, gate 102 outputs voltage Vrd as a low logic voltage similar to signal 74. When voltage |Vtr| decreases less than voltage Vi, or when voltage 49 due to voltage 48 decreases less than voltage Vi, the detector of FIG. 3 enters into the initial reset state, resetting flip-flop 108 as previously described.

As an alternative configuration (not shown) similar to that shown in FIG. 3, voltage |Vtr| is alternatively a voltage magnitude characteristic of voltage 48. In this alternative configuration, generator 30 of FIG. 1 comprises a voltage magnitude generator similar to generator 82. In this case, the characteristic generator 30 has a signal input coupled to line 24, and a characteristic output coupled to the characteristic input of comparator 126. The characteristic output of generator 30 provides voltage |Vtr| to the characteristic input of comparator 126, after time Ti. In this case, generator 90 does not provide a signal output. In addition for device 150, the output of generator 128 is connected to line 152, and the output of generator 140 is connected to line 154. Thus the integrators and associated integrator circuitry of device 150 are not employed. For this case, the maximum and minimum respective limit voltages 50 and 52 occur on lines 152 and 154, respectively, after time Ti. Thus a predetermined magnitude voltage range limit is defined as being greater than limit voltage 52 and less than limit voltage 50. Thus for this case, comparator 126 compares voltage |Vtr| to limit voltages 50 and 52, after time Ti. When voltage |Vtr| is within the magnitude voltage range limit during time interval Tc, flip-flop 108 outputs a valid compare signal, after time interval Tc. After time Tf, an ending event signal occurs. The ring detect signal occurs in response to the ending event and valid compare signals having both occurred. This alternative configuration of FIG. 3 thus demonstrates that a signal characteristic is alternatively a voltage characteristic of voltage 48, and associated signal characteristic limits are alternatively voltage characteristic limits, to detect voltage 48 during time period 0.25 Tp, prior to time 46, All circuit blocks and elements shown in FIG. 3 are well known. Filter 83 and generator 82 are well known, as described and shown in FIG. 9. Comparators 80, 88, 100 and 110 are from a National Semiconductor's LM339 Quad Comparator. Logic inverters, OR gates, AND gates and RS flip-flops are also well known logic devices. Sine wave generators 128 and 140 are also well known. All remaining circuit elements are also well known. It is next shown that the first embodiment of FIG. 3 is unresponsive to other line signals on line 24.

Figure 4:
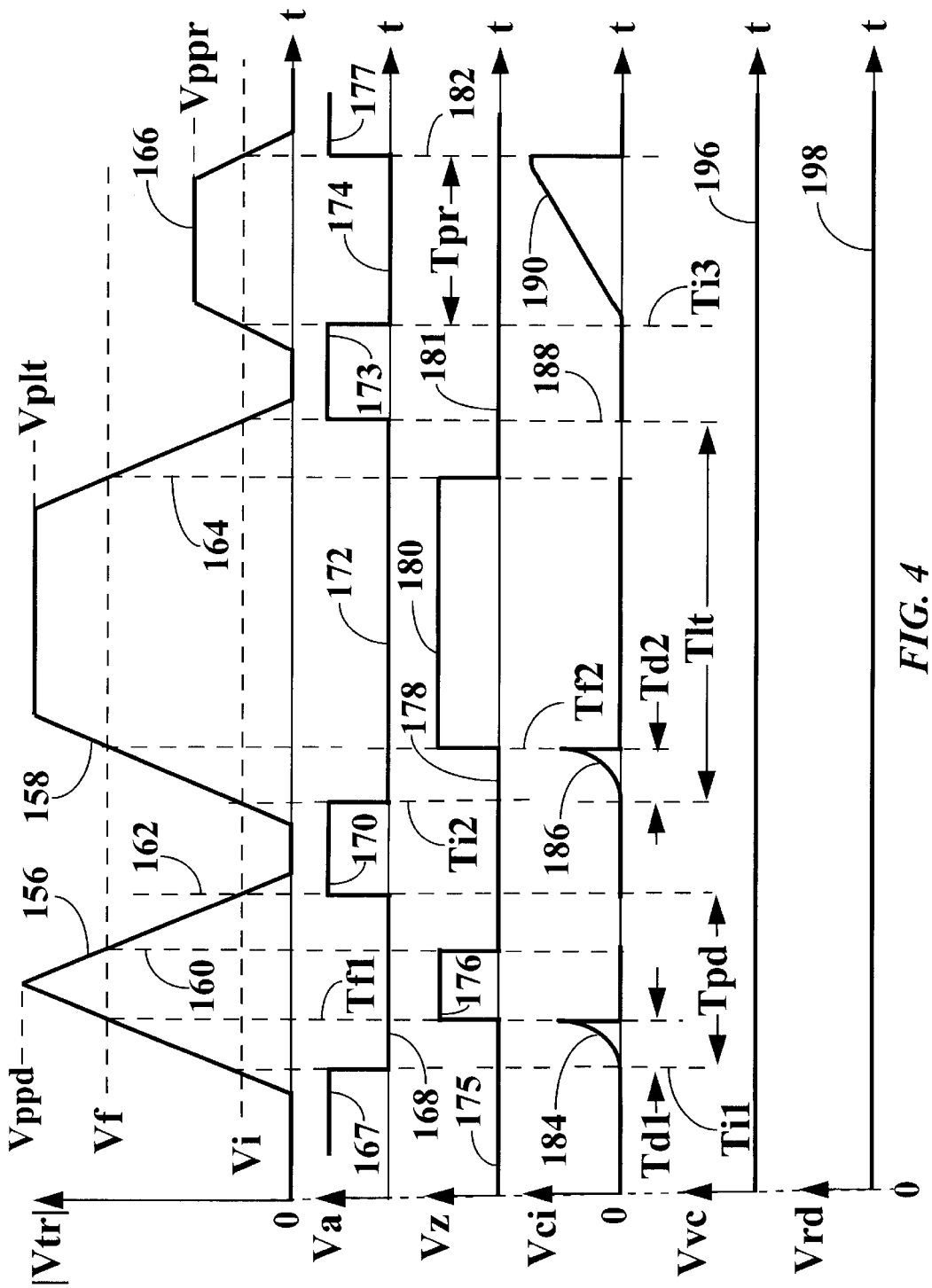
FIG. 4 further shows a magnitude of other line signal voltages on a telecommunication line. Signal logic and characteristic waveforms are shown for the first embodiment of FIG. 3, in response to these other line signals.

FIG. 4 shows voltage magnitude |Vtr| vs. time waveforms of other line signal voltages, being voltage components of voltage Vtr, and are incoming signals to detector 20 on line 24. FIG. 4 also shows waveforms generated by the first embodiment of FIG. 3, in response to these other line signals. The detector waveforms, for voltage integral Vci and for logic voltages Va, Vz, Vvc, and Vrd, are for the same electrical function as described for FIG. 2. The logic signals define a binary low or high logic voltage. Signals 167, 168, 170, 172, 173, 174 and 177 are associated with voltage Va. Signals 175, 176, 178, 180, and 181 are associated with voltage Vz. Signals 196 and 198 are associated with voltages Vvc and Vrd respectively. These other line signals will next be described in detail.

A pulse dialing transient voltage 156 results, by the opening and closing of a pulse dialer, on a premise telephone that is off-hook. Voltage 156 has a peak pulse dialing voltage (Vppd), which can be greater than voltage Vp, and has a pulse dialing time interval (Tpd), which is much less than time period 0.25 Tp. Voltage Vppd is also greater than voltage Vf as shown. Thus for voltage 156, a voltage rise time from voltage Vi to voltage Vf, or a voltage fall time from voltage Vf to voltage Vi, is also much less then time period 0.25 Tp. A routine maintenance line test voltage is provided by the CO for a DC line resistance test between the Tip and Ring wires and from each wire to ground. A switched DC line test voltage 158 results, during this test when the CO switches voltage Vtr as a DC line test voltage to or from line 24. Voltage 158 has a peak DC line test voltage (Vplt) and a DC line test time interval (Tlt). Time interval Tlt is much greater than time period 0.25 Tp. Voltage Vplt can also be greater than voltage Vf as shown. When switched to line 24, the voltage rise and fall times for voltage 158 will be much less than time period 0.25 Tp. A pre-ring per-call line testing voltage 166 is also provided by the CO, for testing line integrity prior to an application of the first ring signal voltage 48. Voltage 166 has a peak pre-ring voltage (Vppr), which is typically less than voltage Vp, and a pre-ring time interval (Tpr), which can be much greater than time period 0.25 Tp. Voltage Vppr is generally less than voltage Vf as shown. The first embodiment of FIG. 3 is next shown to be unresponsive to these other line signals.

The first embodiment of FIG. 3 is shown to be unresponsive to voltage 156, using the waveforms of FIG. 4. Prior to a first initial time Ti1, this detector is in the initial reset state, due to a reset signal 167. During the rise time, voltage 156 increases greater than voltage Vi at time Ti1. This causes comparator 88 to output an initial event signal 168 at the Reset (R) input of flip-flop 108. Signal 168, in combination with a reset signal 175, also causes gate 92 to output a low logic voltage at the reset control output of generator 90. This allows all integration capacitors to be chargeable, and initiates generators 128 and 140 to output voltages 50 and 52 respectively. As a result, the analog integrator associated with resistor Ri and capacitor Ci generates a voltage integral characteristic 184 from voltage 156, after time Ti1. As previously discussed, limits 62 and 66 are also generated from the integration of limit voltages 50 and 52, after time Ti1. Limits 62 and 66 occur on lines 152 and 154 respectively. When voltage 156 exceeds voltage Vf, comparator 80 outputs an ending event signal 176, at a first final time Tf1. As a result, a first discriminating time interval (Td1) is defined, where Td1=(Tf1−Ti1). Voltage 156 is much greater than voltage 49, during time interval Td1, since time interval Td1 is much less than time period 0.25 Tp. Thus integral voltage characteristic 184 will be much greater than limit 62 on line 152, during time interval Td1. As a result, comparator 100 continues to output a low logic voltage at the second input of gate 124, during time interval Td1. Thus, gate 124 maintains a low logic voltage at the Set (S) input of flip-flop 108, and voltage Vvc continues to provide a reset signal 196 at the first input of gate 102, during time interval Td1. Thus gate 102 continues to output a reset signal 198, since signals 196 and 175 are at a low logic voltage during time interval Td1. After time Tf1, signal 176 is applied to the second input of gate 102 and at the first input of gate 92. However since flip-flop 108 remains reset, voltage Vvc continues to maintain signal 196 at the first input of gate 102. Thus, gate 102 continues to output signal 198, after time Tf1. Also, signal 176 at the first input of gate 92 causes gate 92 to output a high logic voltage at the reset control output. This resets all integration capacitors to their initial reset voltage at time Tf1. During the fall time of voltage 156, voltage 156 decreases less than voltage Vf, causing comparator 80 to output a reset signal 178 at a time 160. Since signal 178 occurs at the second input of gate 102 after time 160, gate 102 maintains outputting signal 198 after time 160. When voltage 156 decreases below voltage Vi at a time 162, the detector of FIG. 3 becomes in the initial reset state, due to a reset signal 170. Thus the first embodiment of the inventive detector, shown in FIG. 3, is unresponsive to the pulse dialing transient voltage 156.

The first embodiment of FIG. 3 is next shown to be unresponsive to voltage 158, using the waveforms of FIG. 4. Prior to a second initial time Ti2, this detector is in the initial reset state, due to signal 170. During the rise time, voltage 158 increases greater than voltage Vi at time Ti2, causing comparator 88 to output an initial event signal 172 at the Reset (R) input of flip-flop 108. Signal 172, in conjunction with signal 178, also causes gate 92 to output a low logic voltage at the reset control output of generator 90. This allows all integration capacitors to be chargeable, and initiates generators 128 and 140 to output voltages 50 and 52 respectively. As a result, the analog integrator associated with resistor Ri and capacitor Ci generates a voltage integral characteristic 186 from voltage 158, after time Ti2. In addition, limits 62 and 66 are generated from the integration of voltages 50 and 52, after time Ti2. Limits 62 and 66 occur on lines 152 and 154 respectively. When voltage 158 exceeds voltage Vf, comparator 80 outputs an ending event signal 180, at a second final time Tf2. As a result, a second discriminating time interval (Td2) is defined, where Td2=(Tf2−Ti2). Voltage Vplt is switched to line 24, or alternatively slowly increased on line 24.

When voltage Vplt is switched to line 24 to produce voltage 158, time interval Td2 is much less than time period 0.25 Tp. As a result, voltage 158 is much greater than voltage 49 during time interval Td2, since time interval Td2 is much less than time period 0.25 Tp. Thus integral voltage characteristic 186 is much greater than limit 62 on line 152, during time interval Td2. As a result, comparator 100 continues to output a low logic voltage at the second input of gate 124, during time interval Td2. Thus, gate 124 maintains a low logic voltage at the Set (S) input of flip-flop 108, and voltage Vvc continues to provide signal 196 at the first input of gate 102, during time interval Td2. Thus gate 102 continues to output signal 198, since signals 196 and 178 are at a low logic voltage, during time interval Td2. After time Tf2, signal 180 is applied to the second input of gate 102 and at the first input of gate 92. However, since flip-flop 108 remains reset, voltage Vvc continues to maintain signal 196 at the first input of gate 102. Thus, gate 102 continues to output signal 198 after time Tf2. Also, signal 180 at the first input of gate 92 causes gate 92 to output a high logic voltage at the reset control output. As a result, all integration capacitors are reset to their initial reset voltage at time Tf2. Thus during the switching of voltage 158, the detector of FIG. 3 is unresponsive to a rapid rise time of voltage 158.

During this DC line resistance test, the CO may also slowly increase voltage Vtr from zero volts to voltage Vplt, and then slowly decrease voltage Vtr from voltage Vplt to zero volts. For this case, the voltage Vtr rise and fall times will be much greater than time period 0.25 Tp. As a result, filter 83 will significantly attenuate voltage Vtr. Thus during this DC line test method, voltage |Vtr| may or may not exceed voltage Vi, and will not exceed voltage Vf. When voltage |Vtr| does not exceed voltage Vi, the detector of FIG. 3 remains in the reset state, and signal 198 remains on line 36. When voltage |Vtr| exceeds voltage Vi, but not voltage Vf, comparator 80 does not provide an ending event signal. As a result, a low logic voltage, such as signal 178, is continuously outputted by comparator 80 at the second input of gate 102. As a result, gate 102 continues to output signal 198 on line 36. Thus during a DC line resistance test, when a DC voltage is slowly applied to line 24, the detector of FIG. 3 is unresponsive to a slow rise time of voltage Vtr. Thus the first embodiment shown in FIG. 3 is unresponsive to any application of the DC line test voltage on line 24.

During a fall time of voltage 158, voltage 158 decreases less than voltage Vf, causing comparator 80 to output a reset signal 181 at a time 164. Since signal 181 occurs at the second input of gate 102 after time 164, gate 102 maintains outputting signal 198, after time 164. When voltage 158 decreases below voltage Vi at a time 188, the detector of FIG. 3 becomes in the initial reset state, due to a reset signal 173.

The first embodiment of FIG. 3 is next shown to be unresponsive to voltage 166. using the waveforms of FIG. 4. Prior to a third initial time Ti3, this detector is in the initial reset state, due to signal 173. During a voltage increase, voltage 166 increases greater than voltage Vi at time Ti3, but does not exceed voltage Vf. As a result, an initial event signal 174 occurs at time Ti3, but a subsequent ending event signal does not occur. Although the analog integrators generates a voltage integral characteristic 190 from voltage 166, and limits 62 and 66 are generated after time Ti3, signal 181 is continuously outputted by comparator 80 as a low logic voltage at the second input of gate 102. As a result, gate 102 continues to output signal 198 on line 36 for voltage Vrd. During a voltage decrease, voltage 166 decreases less than voltage Vi at a time 182. As a result, the detector becomes in the initial reset state, due to a reset signal 177. Thus the first embodiment of the inventive detector, shown in FIG. 3, is unresponsive to the pre-ring line test voltage 166. When voltage Vppr exceeds voltage Vf, then the discussion associated with voltage 158 applies.

In summary, the first embodiment of the detector shown in FIG. 3 is responsive to voltage 48 on line 24, by providing ring detect signal 76 during the first time period 0.25 Tp and prior to time 46. However, this first embodiment of FIG. 3 is unresponsive to other line signal voltages on line 24. Specifically, the detector of FIG. 3 does not generate the ring detect signal 76, when voltages 156, 158, and 166 are present on line 24. Thus the first embodiment, shown in FIG. 3 for one aspect of detector 20, discriminates other line signals from the first ring signal on line 24.

Figure 5:
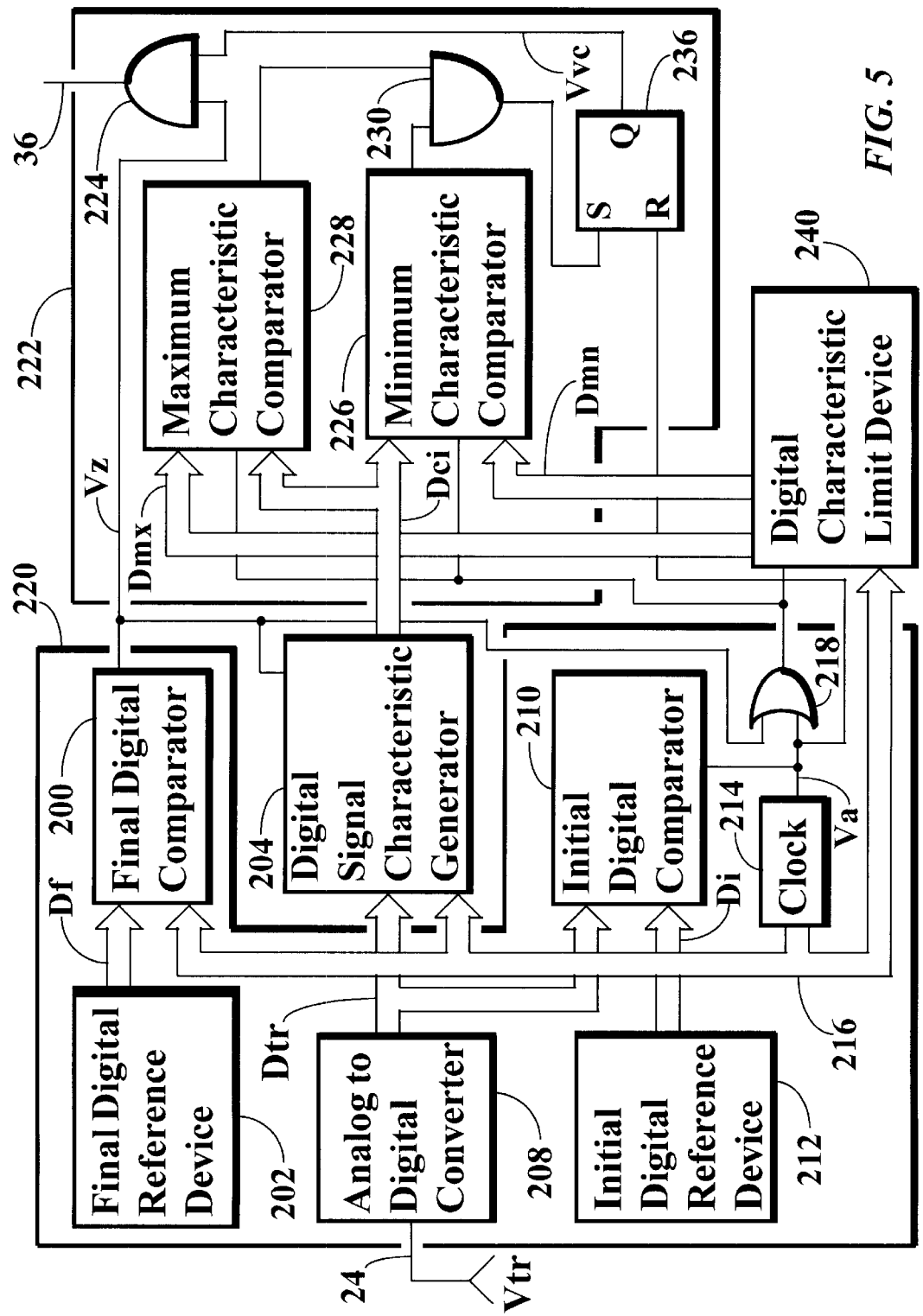
FIG. 5 further illustrates a block diagram of a second embodiment of one aspect of the detector of FIG. 1, employing digital circuit techniques and an integral digital signal characteristic to detect a first ring signal, during a first quarter cycle of the first ring signal.

FIG. 5 shows a second embodiment of one aspect of this invention, employing digital techniques to detect ring signal voltage 48, prior to time 46. In general, this embodiment utilizes a digital representation of a voltage integral characteristic of voltage |Vtr| to discriminate voltage 48 from other line signal voltages on line 24. Since the waveforms and definitions associated with FIG. 2 are general to this invention, FIG. 2 can also be used to describe the function of the embodiment of FIG. 5. This second embodiment comprises an event generator 220, a digital signal characteristic generator 204, a digital signal characteristic comparator 222, and a digital signal characteristic limit device 240. The circuit connections for each electrical device of this second embodiment is next discussed.

Event generator 220 comprises an analog-to-digital converter 208, an initial digital comparator 210, an initial digital reference device 212, a final digital comparator 200, a final digital reference device 202, an OR gate 218, and a digital clock 214. An input of converter 208 is coupled to a signal input of generator 220 and to line 24, for receiving voltage Vtr as an incoming signal. An output of converter 208 is coupled to a signal input of comparator 210 and to a signal output of generator 220. An output of device 212 is coupled to a reference input of comparator 210. An output of device 202 is coupled to a reference input of comparator 200. An output of comparator 200 provides voltage Vz, and is coupled to an ending event output of generator 220 and to a first input of gate 218. An output of comparator 210 provides voltage Va, and is coupled to a control input of clock 214, to a second input of gate 218, and to an initial event output of generator 220. An output of clock 214 is coupled to a clock input of comparator 200, a clock input of generator 204, and to a clock output of generator 220. An output of gate 218 is coupled to a reset control output of generator 220.

Characteristic generator 204 has a signal input, a clock input, a reset input, and a signal characteristic output.

Limit device 240 has a reset control input, a clock input, a maximum limit output, and a minimum limit output.

Comparator 222 comprises an AND gate 224, an AND gate 230, an RS flip-flop 236, a maximum characteristic digital comparator 228, and a minimum characteristic digital comparator 226. A reference input of comparator 228 is coupled to a maximum limit input of comparator 222, and a reference input of comparator 226 is coupled to a minimum limit input of comparator 222. A signal input of comparator 228 is coupled to a signal input of comparator 226 and to a signal characteristic input of comparator 222. A reset input of comparator 228 is coupled to a reset input of comparator 226 and to a reset control input of comparator 222. An output of comparator 228 is coupled to a first input of gate 230. An output of comparator 226 is coupled to a second input of gate 230. A Reset (R) input of flip-flop 236 is coupled to an initial reset control input of comparator 222. A Set (S) input of flip-flop 236 is coupled to an output of gate 230. A Q output of flip-flop 236 provides voltage Vvc, and is coupled to a first input of gate 224. A second input of gate 224 is coupled to an ending event input of comparator 222. An output of gate 224 provides voltage Vrd, and is coupled to an output of comparator 222 and to line 36. The interconnection of each circuit device is next discussed.

Generators 220 and 204, limit device 240, and comparator 222 are also interconnected. The signal output of generator 220 is coupled to the signal input of generator 204. The ending event output of generator 220 is coupled to the reset input of generator 204 and to the ending event input of comparator 222. The signal characteristic output of generator 204 is coupled to the signal characteristic input of comparator 222. The maximum limit input of comparator 222 is coupled to the maximum limit output of device 240. The minimum limit input of comparator 222 is coupled to the minimum limit output of device 240. The initial event output of generator 220 is coupled to the initial reset control input of comparator 222. The reset control output of generator 220 is coupled to the reset control input of device 240 and to the reset control input of comparator 222. A clock output of generator 220 is coupled to a clock input of device 240. The following describes digital representations associated with the circuit blocks of FIG. 5.

Converter 208 outputs a digital representation (Dtr), which is a digital representation of voltage Vtr. Generator 204 outputs a digital integral characteristic representation (Dci), which is a digital representation of a voltage integral signal characteristic of the voltage magnitude |Vtr| of voltage Vtr. Device 212 outputs an initial predetermined digital representation (Di), which is a digital representation of voltage Vi. Device 202 outputs a final predetermined digital representation (Df), which is a digital representation of time interval Td being predetermined. Device 240 outputs a predetermined maximum characteristic limit digital representation (Dmx), which is a digital representation of maximum integral limit 62. Device 240 also outputs a predetermined minimum characteristic limit digital representation (Dmn), which is a digital representation of minimum integral limit 66. The ring detect function for each circuit device and interconnections for this second embodiment is next discussed.

Using the waveforms of FIG. 2, the detector of FIG. 5 is next described to detect voltage 48 prior to time 46. Converter 208 receives voltage 48 as voltage Vtr being an incoming signal on line 24, and outputs representation Dtr of voltage Vtr. Representation Dtr is applied to the signal input of comparator 210 and the signal input of generator 204. The initial reset state for this second embodiment is next discussed.

When voltage |Vtr| is less than voltage Vi, representation Dtr is less than representation Di, and the detector of FIG. 5 is in an initial reset state. During the initial reset state, comparator 210 outputs voltage Va as reset signal 54. Signal 54 resets clock 214, which outputs a digital reset time representation of zero time on a digital clock bus 216. The zero time representation also resets generator 204, which outputs an initial reset representation of zero for representation Dci. In addition, the zero time representation resets comparator 200, which outputs signal 58 for voltage Vz. Signal 54 also resets flip-flop 236, causing the Q output to provide voltage Vvc as signal 68, at the first input of gate 224. Thus gate 224 outputs voltage Vrd as signal 74 on line 36, during the initial reset state. Also, in response to signal 54, gate 218 outputs a reset control signal as a high logic voltage, during the initial reset state. The reset control signal resets device 240, to output a reset magnitude for representations Dmx and Dmn associated with time Ti. The reset control signal also resets comparators 226 and 228, which both output a low logic voltage to the inputs of gate 230. As a result, gate 230 provides a low logic voltage at the Set (S) input of flip-flop 236. The initial reset state is terminated when voltage |Vtr| exceeds voltage Vi, and a signal characteristic is generated as is next discussed.

When voltage |Vtr| exceeds voltage Vi at time Ti, comparator 210 detects that representation Dtr equals or exceeds representation Di at time Ti, and in response, outputs an initial event signal 56 at time Ti. Since representation Di is predetermined, then voltage Vi is predetermined, and signal 56 results when the signal magnitude of voltage 48 equals or exceeds voltage Vi. Thus the initial event signal 56 is generated, in response to detecting the incoming signal voltage 48 having a predetermined signal magnitude of voltage Vi. Signal 56 activates clock 214, by incrementing a digital clock count representation on bus 216, from the zero time representation after time Ti. This enables generator 204 to receive representation Dtr, and to utilize a digital integral algorithm for generating representation Dci from representation Dtr, after time Ti. When voltage Vtr is the ring signal voltage 48, then voltage |Vtr| is voltage 49, and representation Dci is the digital representation of characteristic 64 of voltage 48. Thus the digital integral representation Dci, of characteristic 64 of the incoming signal 48, is generated after the initial event signal 56. Signal 56 is also applied to the Reset (R) input of flip-flop 236 and to the second input of gate 218. After time Ti, voltage Vz remains as signal 58, until the clock count representation on bus 216 equals representation Df. Thus signals 56 and 58 are both present after time Ti, at the inputs of gate 218. As a result, gate 218 outputs a low logic voltage at the reset control output of generator 220. This enables device 240 and comparators 226 and 228 to become active with each incrementing clock count representation on bus 216. The generation of the characteristic limit is next discussed.

When active, device 240 outputs incremental magnitudes of representations Dmx and Dmn to the reference inputs of comparators 228 and 226, respectively, for each incremental clock count representation. Since representations Dmx and Dmn represent voltage integral limits 62 and 66, device 240 provides a predetermined voltage integral signal characteristic range limit representation defined by integral limit representations Dmx and Dmn. The integral range limit representation is a digital representation of the predetermined voltage integral signal characteristic range limit of voltage 48. The comparison of the signal characteristic with signal characteristic limits is next discussed.

Comparator 228 and 226 compares integral representation Dci to integral limit representations Dmx and Dmn, respectively, for each incremental clock count representation. After time Ti, comparator 228 outputs a high logic voltage, when representation Dci is less than representation Dmx. Comparator 226 also outputs a high logic voltage, when representation Dci is greater than representation Dmn. Alternatively, comparators 226 and 228 include digital filtering, to improve the confidence level that representation Dci is due to the ring signal voltage 48. When digital filtering is employed, comparator 228 and 226 continuously compare representation Dci to representations Dmx and Dmn, respectively, for the predetermined confidence time interval Tc as shown. Thus when representation Dci is less than representation Dmx, and greater than representation Dmn for a substantial portion of time interval Tc, a high logic voltage occurs at the output of both comparators 228 and 226, after time interval Tc. Thus the high logic voltage at both inputs of gate 230 causes a high logic voltage at the Set (S) input of flip-flop 236. As a result, the Q output of flip-flop 236 outputs voltage Vvc as the valid compare signal 72, at time 70. Thus the valid compare signal 72 is generated in response to representation Dci of characteristic 64 being within the integral range limit representation. Representation Dci is within the integral range limit representation, when representation Dci is less than representation Dmx and greater than representation Dmn. The generation of the ending event signal and the ring detect signal is next discussed.

When clock 214 outputs a clock count representation on bus 216 equal to representation Df, comparator 200 outputs ending event signal 60 at the second input of gate 224 and at the first input of gate 218 at time Tf. Since representation Df is predetermined, representation Df defines the discriminating time interval Td=(Tf−Ti) as also being predetermined. Thus ending event signal 60 is generated, when the predetermined time interval Td has elapsed from when the initial event signal 56 has occurred. Since signals 60 and 72 have occurred and are both present at the inputs of gate 224 after time Tf, gate 224 outputs the ring detect signal 76 for voltage Vrd on line 36, after time Tf. Thus the ring detect signal 76 is generated during time period 0.25 Tp for voltage 48, in response to the valid compare signal 72 and ending event signal 60 having occurred. Since signal 60 occurs at the first input of gate 218 at time Tf, gate 218 outputs the reset control signal as a high logic voltage at the reset control output of generator 220, at time Tf. In response to this high logic voltage, comparators 226 and 228 and limit device 240 are reset at time Tf, and representation Dci is terminated, in response to ending event signal 60. However, it is not necessary to reset representation Dci, in response to the ending event signal, in order to detect the ring signal prior to time 46. Thus after time Tf, a low logic voltage occurs at the Set (S) input of flip flop 236, but the Q output maintains signal 72 at the first input of gate 224, since flip-flop remains set. Since signals 60 and 72 remain present at the inputs of gate 224, signal 76 remains at the output of gate 224 on line 36, after time Tf. After time Tf, this second embodiment enters into the reset state, in response to voltage |Vtr|, as is next discussed.

When voltage |Vtr| decreases less than voltage Vi, or when voltage 49 due to voltage 48 decreases less than voltage Vi, representation Dtr becomes less than representation Di. As a result, comparator 210 outputs a high logic voltage for voltage Va, which resets flip-flop 236, clock 214, limit device 240 and comparators 226 and 228. Thus the detector of FIG. 5 enters into the initial reset state, as previously described.

Each of the functions and functional blocks shown in FIG. 5 are well known to those skilled in the art. For example, converter 208 is an 8 bit A/D converter, such as Harris Semiconductor's ADC0804 8 bit uP Compatible A/D Converter. Converter 208 outputs representation Dtr as a parallel 8 bit representation on an 8 bit parallel bus. This 8 bit parallel bus provides 8 bits of parallel data to the signal input of generator 204 and to the signal input of comparator 210. Clock 214 is a well known digital clock, comprising a well known oscillator and digital counter activated by the clock input. The oscillator provides a frequency signal as input to a well known 8 bit counter, which outputs an 8 bit incrementing word on an 8 bit parallel bus 216. Thus the reference input to comparator 200, the clock input to generator 204, and the clock output of generator 220 are on an 8 bit parallel bus. Reference devices 212 and 202 are well known digital memory storage devices, which output an 8 bit word on an 8 bit parallel bus as input to the reference input of comparator 210 and to the reference input of comparator 200, respectively. Generator 204 is a well known Digital Signal Processor (DSP), programmable to receive representation Dtr for every clock count representation, and provides a well known digital integration function to generate representation Dci from representation Dtr. The OR gate 218, flip-flop 236, and AND gates 224 and 230 are also well known logic devices. Representation Dci is outputted as an 8 bit word on a parallel 8 bit bus. Device 240 is comprised of well known digital memory devices and well known analog switches. The digital memory devices store limit representations Dmx and Dmn of characteristic limits 62 and 66, respectively, as specific digital limit magnitude for each clock count representation, during time interval Td. The limit representations can be stored in programmable memory, or can be stored in Read Only Memory (ROM), both or which are well known in the art. The analog switches couple the stored limit representations in memory to the maximum and minimum limit outputs as respective 8 bit words on respective 8 bit busses. Thus for each incrementing clock count representation, the stored limit representations for limits 62 and 66 are incremented on the respective 8 bit busses. The analog switch is well known, such as a Motorola MC14016 Quad Analog Switch/Multiplexer. Digital comparators 200, 210 226 and 228 are also well known, such as a Motorola MC14585 4-bit Magnitude Comparator. Although in this embodiment, 8 bits of parallel data are being sent on an 8 bit parallel bus, other methods of digital data transfer are possible. For an alternative example, 4 bits of parallel data are generated and transferred on a 4 bit parallel bus, or 8 bits or 4 bits of data are transferred on a single wire as serial data. The response of this second embodiment to other line signals on line 24 is next discussed.

Figure 6:
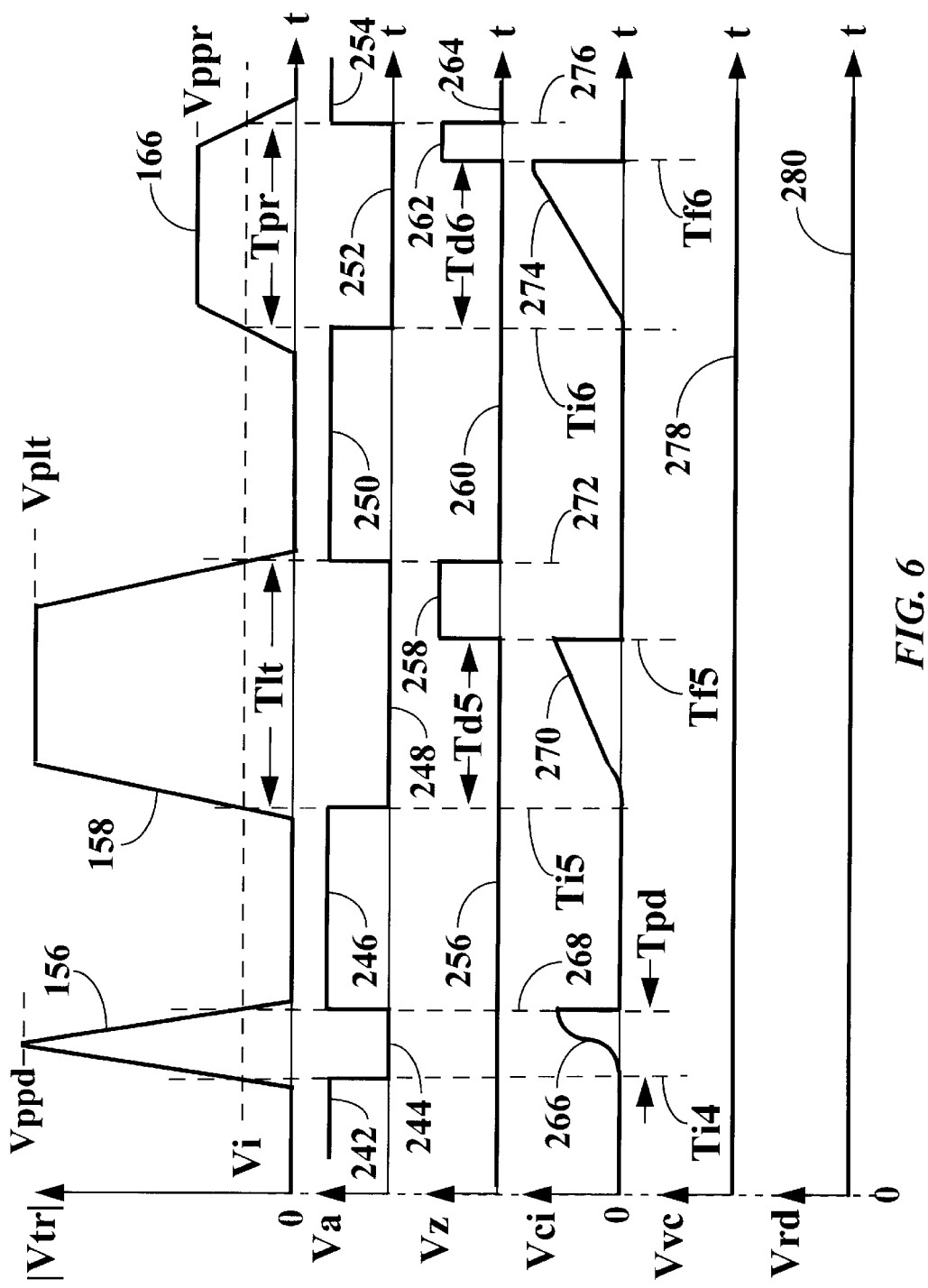
FIG. 6 shows a magnitude of other line signal voltages on a telecommunication line. Signal logic waveforms and an integral characteristic waveform represented by a digital integral characteristic are also shown for the second embodiment of FIG. 5, in response to these other line signals.

FIG. 6 shows voltage magnitude |Vtr| vs. time waveforms of other line signal voltages 156, 158, and 166, as also shown in FIG. 4. In addition, FIG. 6 shows waveforms generated by the second embodiment of FIG. 5, in response to these other line signals. The detector waveforms for voltage integral Vci and for logic voltages Va, Vz, Vvc, and Vrd, are for the same function as described for FIG. 2. The logic signals define a binary low or high logic voltage. Signal 242 through signal 254 are associated with voltage Va. Signal 256 through signal 264 are associated with voltage Vz. Signals 278 and 280 are associated with voltages Vvc and Vrd respectively. It is next shown that this second embodiment is unresponsive to these other line signals on line 24.

The second embodiment of FIG. 5 is next shown to be unresponsive to a pulse dialing voltage 156, using the waveforms of FIG. 6. Prior to a fourth initial time Ti4, this detector is in the initial reset state, due to a reset signal 242. During the rise time, voltage 156 increases greater than voltage Vi, at time Ti4. Since in response, representation Dtr becomes greater than representation Di at time Ti4, comparator 210 outputs an initial event signal 244 at the Reset (R) input of flip-flop 236. Signal 244 also activates clock 214, which enables generator 204 to receive representation Dtr, and generate representation Dci. Representation Dci, in this case, is a digital integral representation of a voltage integral characteristic 266 of voltage 156, as shown by voltage Vci. After time Ti4, signal 244 in combination with a reset signal 256, causes gate 218 to output a low logic voltage at the reset control output of generator 220. As a result, limit device 240 and comparators 226 and 228 become active, after time Ti4. When voltage 156 decreases below voltage Vi at a time 268, representation Dtr becomes less than representation Di. Thus comparator 210 outputs a reset signal 246 to the Reset (R) input of flip-flop 236, clock 214, limit device 240 and comparators 226 and 228. As a result, the detector of FIG. 5 enters into the initial reset state, due to signal 246 at time 268. Thus representation Dci, being representative of integral characteristic 266, occurs after time Ti4 and during time interval Tpd as shown. During time interval Tpd, representation Dci is compared to limit representations Dmx and Dmn with comparators 226 and 228. Voltage 156 is much greater than voltage 49, during time interval Tpd, since time period 0.25 Tp is much greater than time interval Tpd. Thus integral characteristic 266 is greater than integral limit 62, and representation Dci will exceed representation Dmx, during time interval Tpd. Thus comparator 228 will maintain a low logic voltage at the first input of gate 230. As a result, flip-flop 236 remains reset, maintaining a reset signal 278 at the first input of gate 224, after time Ti4. Thus gate 224 outputs signal 280, during time interval Tpd. Since clock 214 is reset at time 268, and time interval Tpd is much less than predetermined time interval Td, the digital clock count representation on bus 216 does not exceed representation Df, before being reset at time 268. Thus comparator 200 maintains voltage Vz as signal 256 at the second input of gate 224. Thus an ending event signal does not occur for voltage 156. As a result, gate 224 outputs and maintains a reset signal 280 on line 36 for voltage Vrd, indicating the absence of the ring signal. Thus the second embodiment, shown in FIG. 5 for one aspect of detector 20, is unresponsive to pulse dialing voltage 156. The second embodiment is next shown to be unresponsive to a voltage Vplt of voltage 158 being switched to line 24, or slowly increased on line 24.

Using the waveforms of FIG. 6, the second embodiment of FIG. 5 is next shown to be unresponsive to DC line test voltage 158, when being switched to line 24. Prior to a fifth initial time Ti5, this detector is in the initial reset state, due to reset signal 246. During the rise time, voltage 158 increases greater than voltage Vi at time Ti5. Since in response, representation Dtr becomes greater than representation Di at time Ti5, comparator 210 outputs an initial event signal 248 at the Reset (R) input of flip-flop 236. Signal 248 also activates clock 214, which enables generator 204 to receive representation Dtr, and generate representation Dci. Representation Dci, in this case, is a digital integral representation of a voltage integral characteristic 270 of voltage 158. After time Ti5, signal 248 in combination with signal 256, also causes gate 218 to output a low logic voltage at the reset control output of generator 220. As a result, limit device 240 and comparators 226 and 228 become active, after time Ti5. Since time period 0.25 Tp is much less than time interval Tlt, clock 214 will increment the clock count representation on bus 216 to a digital magnitude of representation Df, at a fifth final time Tf5. As a result, comparator 200 will output an ending event signal 258 for voltage Vz, after time Tf5. Thus a fifth predetermined discrimination time interval (Td5) is defined as Td5=(Tf5−Ti5), being less than time period 0.25 Tp. In response to signal 258, generator 204, limit device 240 and comparators 226 and 228 are reset as previously discussed. During time interval Td5, representation Dci of integral characteristic 270 is compared to limit representations Dmx and Dmn, using comparators 226 and 228. Voltage 158 is much greater than voltage 49, during time interval Td5, since the rise time of voltage 158 is much greater then time period 0.25 Tp. Thus integral characteristic 270 is greater than limit 62, and representation Dci exceeds representation Dmx, during time interval Td5. As a result, comparator 226 will maintain a low logic voltage at the first input of gate 230. Thus, flip-flop 236 remains reset, maintaining signal 278 at the first input of gate 224. Therefore gate 224 outputs and maintains signal 280 on line 36 for voltage Vrd, indicating an absence of the ring signal. When voltage 158 decreases less than voltage Vi at a time 272, representation Dtr becomes less than representation Di, and comparator 210 outputs a reset signal 250. Signal 250 is applied to the Reset (R) input of flip-flop 236 and clock 214. As a result, a reset signal 260 is outputted by comparator 200, and the detector of FIG. 5 enters into the initial reset state as previously described. Thus the second embodiment, shown in FIG. 5 for one aspect of detector 20, is unresponsive to a switched DC line test voltage 158.

When voltage 158 results from a slowly increasing line test voltage as previously described, representation Dtr will again exceed representation Di, at time Ti5. As a result, comparator 210 causes generator 204 to generate the integral representation Dci from voltage 158, having a very slow rise time. In addition, comparators 226 and 228 compare representation Dci with representations Dmx and Dmn, for this case, after time Ti5. After time Ti5, comparator 200 will output an ending event signal at time Tf5, after time interval Td5, which is less than time period 0.25 Tp. Since the rise time of voltage 158 is much greater than time period 0.25 Tp in this case, voltage 49 will be much less than voltage 158, during time interval Td5. As a result, integral characteristic 270 is much less than limit 66, during time interval Td5. As a result, representation Dci generated by generator 204 is much less than representation Dmn, during time interval Td5. As a result, comparator 226 will maintain a low logic voltage at the second input of gate 230. Thus, flip-flop 236 remains reset, maintaining signal 278 at the first input of gate 224. Therefore, gate 224 outputs and maintains signal 280 on line 36 for voltage Vrd, indicating an absence of the ring signal. When voltage 158 eventually decreases below voltage Vi at time 272, the detector of FIG. 5 will again enter into the reset state, causing a low logic voltage at the second input of gate 224, and thereby maintaining signal 280 on line 36 as previously described. Thus the second embodiment, shown in FIG. 5 for one aspect of detector 20, is unresponsive to a slowly increasing DC line test voltage 158.

Using the waveforms of FIG. 6, the second embodiment of FIG. 5 is next shown to be unresponsive to voltage 166. Prior to a sixth initial time Ti6, this detector is in the initial reset state, due to reset signal 250. During the rise time, voltage 166 increases greater than voltage Vi at time Ti6. Since in response, representation Dtr becomes greater than representation Di at time Ti6, comparator 210 outputs an initial event signal 252 at the Reset (R) input of flip-flop 236. Signal 252 also activates clock 214, which enables generator 204 to generate representation Dci from representation Dtr. Representation Dci, in this case, is a digital integral representation of a voltage integral characteristic 274 of voltage 166. After time Ti6, signal 252, in combination with signal 260, also causes gate 218 to output a low logic voltage at the reset control output of generator 220. As a result, limit device 240 and comparators 226 and 228 become active, after time Ti6. Since time period 0.25 Tp is much less than time interval Tpr, clock 214 will increment the clock count representation on bus 216 to a digital magnitude of representation Df, at a sixth final time Tf6. As a result, comparator 200 will output an ending event signal 262 for voltage Vz, at time Tf6. Thus a sixth predetermined discriminating time interval (Td6) is defined as time Td6=(Tf6−Ti6), being less than time period 0.25 Tp. In response to signal 262, generator 204, limit device 240 and comparators 226 and 228 are reset as previously discussed. During time interval Td6, representation Dci of integral characteristic 274 is compared to limit representations Dmx and Dmn, using comparators 226 and 228. Voltage 166 is much greater than voltage 49, during most of time interval Td6, since the rise time of voltage 166 is much less than time period 0.25 Tp. Thus integral characteristic 274 is greater than integral limit 62, during most of time interval Td6. Thus representation Dci will exceed representation Dmx, during most of time interval Td6. Thus comparator 228, having a digital filter, will maintain a low logic voltage at the first input of gate 230, during time interval Td6. Therefore, flip-flop 236 remains reset, maintaining signal 278 at the first input of gate 224. As a result, gate 224 outputs and maintains signal 280 on line 36 for voltage Vrd. When voltage 166 decreases below voltage Vi at a time 276, representation Dtr becomes less than representation Di. Comparator 210 thus outputs a reset signal 254 to the Reset (R) input of flip-flop 236 and to the input of clock 214. As a result, a reset signal 264 is outputted by comparator 200, and the detector of FIG. 5 enters into the initial reset state as previously described. Thus the second embodiment, shown in FIG. 5 for one aspect of detector 20, is unresponsive to a pre-ring line test voltage 166.

In summary, the second embodiment of the detector shown in FIG. 5 is responsive to voltage 48 on line 24, by providing ring detect signal 76 of FIG. 2, during the first time period 0.25 Tp and prior to time 46. However, this second embodiment of FIG. 5 is unresponsive to other line signal voltages on line 24. Specifically, the detector of FIG. 5 does not generate the ring detect signal 76, when voltages 156, 158, and 166 are present on line 24. Thus the second embodiment, shown in FIG. 5 for one aspect of detector 20, discriminates other line signals from the first ring signal on line 24. A third embodiment of detector 20 is next discussed.

Figure 7:
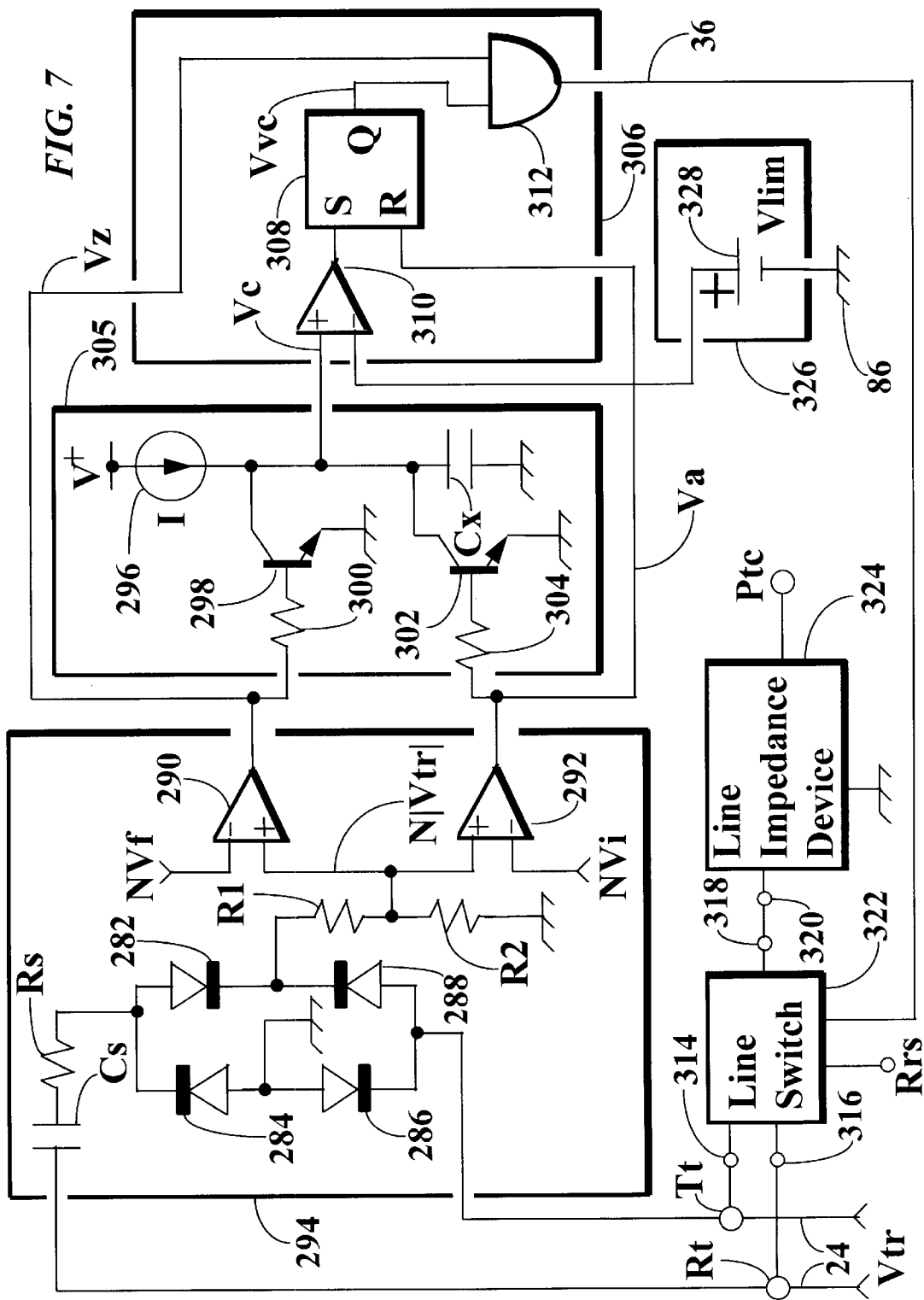
FIG. 7 illustrates a partial block and circuit diagram of a third embodiment of the inventive ring signal detector. This detector employs analog circuit techniques using a slope approximation signal characteristic to detect a first ring signal, during a first quarter cycle of the first ring signal.

FIG. 7 shows a third embodiment of the invention, again employing analog techniques, to detect the ring signal voltage 48 prior to time 46. This embodiment, however, utilizes an approximate characteristic slope (Sa) of voltage |Vtr|, to discriminate voltage 48 from other line signal voltages on line 24. For an example of slope Sa, slope Sa of voltage 49 can be determined from voltage Vi and the corresponding time Ti, in combination with the voltage Vf and the corresponding time Tf, with voltage and time as defined in FIG. 2. Thus an approximate voltage vs. time characteristic slope Sa is written as Sa=(Vf−Vi)/(Tf−Ti). In this case, slope Sa is an approximate slope of voltage 49, since slope Sa is defined by only two voltage vs. time data points, for this embodiment. This embodiment determines and compares slope Sa to a predetermined approximate characteristic slope limit. When slope Sa is within a predetermined characteristic slope range limit, bounded by the characteristic slope limit, a valid compare signal is generated. This embodiment also provides an initial event signal at time Ti and an ending event signal at time Tf, after time Ti. The signal discriminating time interval Td=(Tf−Ti) is thus defined. The ring detect signal is provided prior to time 46, in response to the valid compare signal and ending event signal, having both occurred. The following description will clarify the inventive ring signal detection function of this third embodiment.

The third embodiment of FIG. 7 comprises an event generator 294, a signal characteristic slope generator 305, a signal characteristic slope comparator 306, a signal characteristic slope limit device 326, a line switch 322, and an enhanced line impedance device 324, having an off-hook terminal impedance. A description of each circuit block connections is next discussed.

Generator 294 comprises a final time comparator 290, an initial time comparator 292, a magnitude generator comprising a diode bridge with diodes 282, 284, 286, and 288, a predetermined scaled initial voltage NVi, and a predetermined scaled final voltage NVf. Generator 294 further comprises a high pass filter and a scaling network utilizing a capacitor Cs and resistors Rs, R1 and R2. For both reference voltages, a factor N is a scale factor less than 1, which scales voltages Vf and Vi by factor N. A Ring input of generator 294 is coupled to a telecommunication Ring terminal (Rt), which is coupled to one wire of line 24. A Tip input of generator 294 is coupled to a telecommunication Tip terminal (Tt), which is coupled to a second wire of line 24. The Ring input of generator 294 is coupled to capacitor Cs. The Tip input of generator 294 is coupled to a cathode of diode 286 and an anode of diode 288. Resistor Rs is coupled to capacitor Cs, to an anode of diode 282, and to a cathode of diode 284. An anode of diode 284 is coupled to an anode of diode 286 and to ground 86. A cathode of diode 282 is coupled to a cathode of diode 288 and to resistor R1. Resistor R2 is coupled to resistor R1 and to positive inputs of comparators 290 and 292. Resistor R2 is also coupled to ground 86. A negative input of comparator 290 is coupled to voltage NVf, and a negative input of comparator 292 is coupled to voltage NVi. An output of comparator 290 is coupled to an ending event output of generator 294, providing voltage Vz. An output of comparator 292 is coupled to an initial event output of generator 294, providing voltage Va.

Generator 305 comprises base resistors 300 and 304, a final reset transistor 298, an initial reset transistor 302, a capacitor Cx, a current source 296 having a current magnitude 1, and a supply voltage V+. Resistor 300 is coupled to an ending event input of generator 305, and resistor 304 is coupled to an initial event input of generator 305. Resistor 300 is coupled to a base of transistor 298, having an emitter coupled to ground 86. Resistor 304 is coupled to a base of transistor 302, having an emitter coupled to ground 86. A characteristic output of generator 305 is coupled to current source 296, capacitor Cx, and collectors of transistors 298 and 302. Capacitor Cx is coupled to ground 86, and current source 296 is further coupled to voltage V+.

Limit device 326 comprises a voltage source 328, having a voltage limit magnitude voltage (Vlim). A negative terminal of source 328 is coupled to ground 86, and a positive terminal is coupled to a maximum limit output of device 326.

Comparator 306 comprises a comparator 310, an AND gate 312 and an RS flip-flop 308. A positive input of comparator 310 is coupled to a characteristic input of comparator 306. A negative input of comparator 310 is coupled to a maximum limit input of comparator 306. An output of comparator 310 is coupled to a Set (S) input of flip-flop 308. A Reset (R) input of flip-flop 308 is coupled to an initial reset control input of comparator 306. A first input of gate 312 is coupled to a Q output of flip-flop 308, and a second input of gate 312 is coupled to an ending event input of comparator 306. An output of gate 312 is coupled to the output of comparator 306 and to line 36. Each of the circuit blocks of FIG. 7 are interconnected and is next described.

The ending event output of generator 294 is coupled to the ending event input of comparator 306 and to an ending event input of generator 305. The initial event output of generator 294 is coupled to the initial reset control input of comparator 306 and to an initial event input of generator 305. The characteristic output of generator 305 is coupled to the characteristic input of comparator 306. The maximum limit input of comparator 306 is coupled to the maximum limit output of device 326. The output of comparator 306 is coupled to a control input of switch 322, by line 36. A first terminal 314 of switch 322 is coupled to the Tip Tt terminal and to line 24. A second terminal 316 of switch 322 is coupled to the Ring Rt terminal and to line 24. An impedance terminal 320 of device 324 is coupled to a third terminal 318 of switch 322. A ring signal detector reset terminal (Rrs) is also coupled to switch 322. Device 324 is also coupled to ground 86, and is enhanced, by providing a bidirectional telecommunications port (Ptc). The ring signal detection function is next described for FIG. 7, using FIG. 8.

Figure 8:
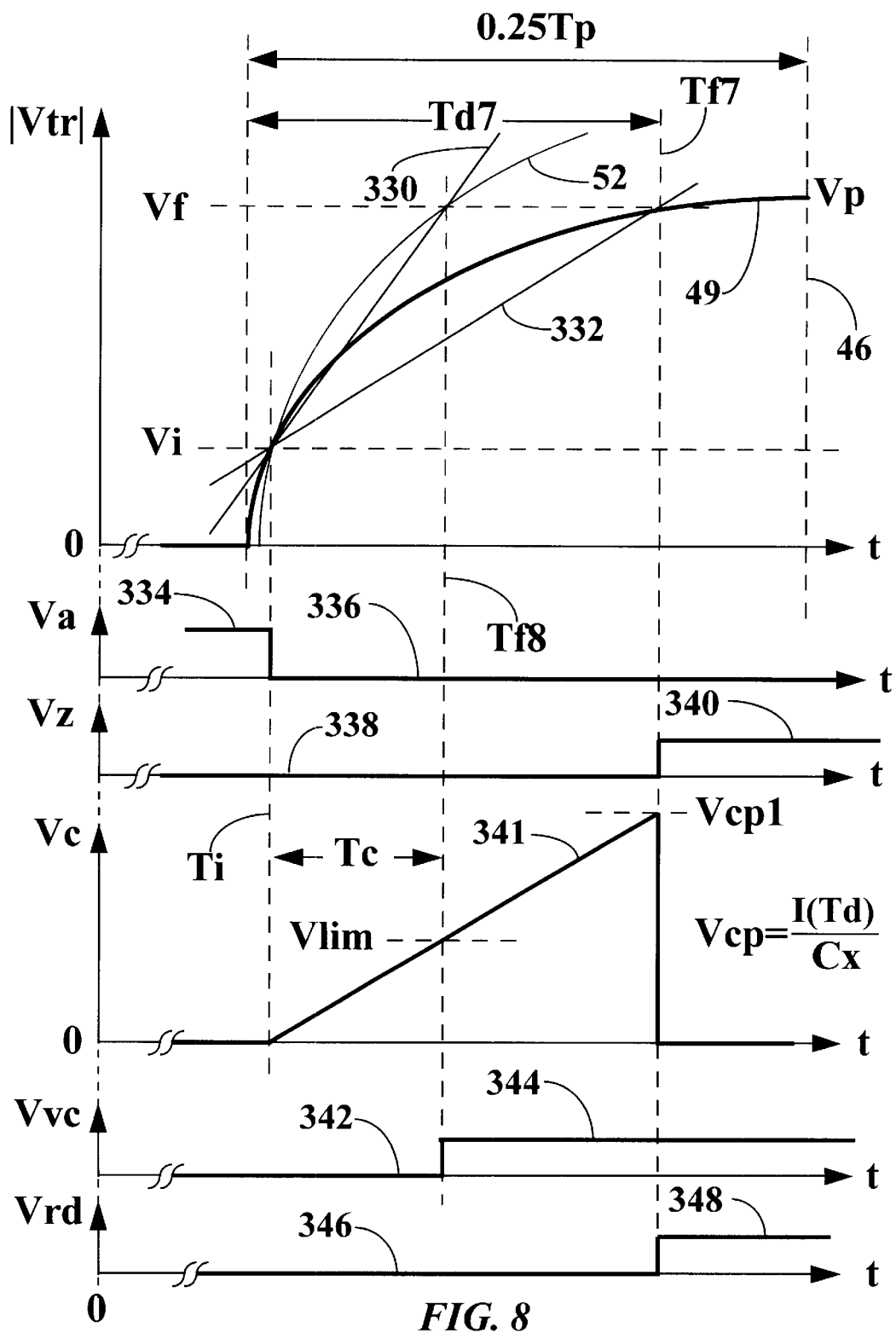
FIG. 8 demonstrates a capacitor voltage waveform representing a slope characteristic of the ring signal voltage and logic waveforms employed by the third embodiment shown in FIG. 7, for detecting a first ring signal during a first quarter cycle of the first ring signal.

FIG. 8 shows voltage vs. time waveforms associated with the third embodiment of FIG. 7, when detecting voltage 48 prior to time 46. Voltage |Vtr| shows the nominal voltage 49 for voltage 48 and the maximum limit voltage 52 for voltage 48. Also shown is a nominal approximate characteristic slope 332 of voltage 49 associated with voltages Vi and Vf, and times Ti and a seventh final time Tf7. A maximum approximate characteristic slope limit 330 is also shown for voltage 52, associated with voltages Vi and Vf and times Ti and an eighth final time Tf8. Slope 332 of voltage 49 is shown within a predetermined approximate characteristic slope range limit, bounded by maximum slope limit 330. The slope of voltage 49 is within the slope range limit, when the slope of voltage 49 is less than maximum slope limit 330. Voltages Va, Vz, Vvc, and Vrd are logic voltages, and provide the same logic function as described for FIG. 2. All logic levels shown are binary logic voltages. Logic signals 334 and 336 are associated with voltage Va, and signals 338 and 340 are associated with voltage Vz. Logic signals 342 and 344 are associated with voltage Vvc, and signals 346 and 348 are associated with voltage Vrd. A functional description for ring signal detection using this third embodiment follows.

A functional description of the third embodiment shown in FIG. 7 is next discussed, using the associated waveforms shown in FIG. 8. Voltage Vtr is coupled to be received, between the Tip and Ring wires of line 24. Thus voltage Vtr occurs between the Tip Tt and Ring Rt terminals, and is an incoming signal voltage to this third embodiment, at the input of generator 294. The diodes of generator 294 form a well known full wave bridge rectifier. The bridge rectifier converts a periodic bipolar input voltage, such as a sinusoidal voltage waveform, into a unipolar voltage magnitude, at the output of the bridge rectifier relative to ground 86. In addition, capacitor Cs and resistors Rs, R1 and R2 provide a well known high pass filter and voltage scaling function. For ring signal frequencies, the impedance of capacitor Cs is negligible relative to resistors Rs, R1 and R2. Thus for ring signal frequencies and greater, resistors Rs, R1 and R2, in combination with the bridge rectifier, provide a scaled magnitude of voltage Vtr, or a scaled magnitude voltage N|Vtr|. Factor N is less than 1, being defined as N=R2/(Rs+R1+R2). Thus neglecting voltage drops associated with the bridge rectifier diodes, voltage N|Vtr| is outputted to the positive inputs of comparators 290 and 292 as shown. The value of scaling factor N also defines the predetermined initial and final reference voltages, NVi and NVF respectively. The initial reset state of this third embodiment is next discussed.

In the initial reset state, voltage Vtr is substantially zero. Thus voltage N|Vtr| is less than voltage NVi, and comparator 292 outputs a reset signal 334. As a result, base current through resistor 304 activates transistor 302 to conduct, causing a capacitor voltage (Vc) across capacitor Cx to be reset to approximately zero volts. Since voltage Vc at the positive input of comparator 310 is less than voltage Vlim at the inverting input, comparator 310 outputs a low logic voltage at the Set (S) input of flip-flop 308, during initial reset. Signal 334 also occurs at the Reset (R) input of flip-flop 308, which resets the Q output, providing a reset signal 342 at the first input of gate 312. Since voltage N|Vtr| is also less than voltage NVF, comparator 290 outputs a reset signal 338, at the second input of gate 312, which also causes transistor 298 to be non-conductive. Thus during the initial reset state of this third embodiment, signals 338 and 342 are both a low logic voltage, and both occurring at the inputs of gate 312. Thus gate 312 outputs a reset signal 346 for voltage Vrd on line 36, indicating the absence of the ring signal voltage, during the initial reset state. In response to signal 346, switch 322 remains in an open non-conducting condition between device 324 and line 24, during the initial reset state.

In general, generator 305 receives signal characteristic information from voltage Vtr through generator 294. For example, the time difference between an initial and final event signal from voltage 48 is a function of slope Sa of voltage 48. This time difference for slope 332 is different then for slope limit 330. In response to this characteristic time difference associated with voltage |Vtr|, generator 305 generates a peak capacitor voltage (Vcp) of voltage Vc, which represents a signal characteristic slope Sa of voltage |Vtr|. Specifically, peak voltage Vcp is inversely proportional to characteristic slope Sa of voltage |Vtr|. Thus peak voltage Vcp of voltage Vc is used to determine when characteristic slope Sa is greater or less than maximum slope limit 330. Slope Sa being represented by voltage Vcp will be more clearly understood with subsequent discussions.

It is next shown that slope Sa of voltage 48 is represented by voltage Vcp, which is inversely proportional to slope Sa. When voltage 48 occurs, voltage 49 equals or exceeds voltage Vi at time Ti, resulting in comparator 292 detecting voltage N|Vtr|, being equal or greater than voltage NVi at time Ti. Since voltage NVi is predetermined, voltage Vi is also predetermined. Thus comparator 292 detects when voltage 48 equals or exceeds voltage Vi, and outputs an initial event signal 336, after time Ti. This causes transistor 302 to be non-conductive, and provides signal 336 at the Reset (R) input of flip-flop 308. Thus after time Ti and when voltage N|Vtr| is less than voltage NVF, comparator 290 outputs signal 338. Thus after time Ti, transistors 298 and 302 are both non-conductive, allowing a signal characteristic slope of voltage 49 to be generated with voltage Vc. As a result, the signal characteristic slope, represented by a slope characteristic voltage 341, is generated across capacitor Cx for voltage Vc, after time Ti as shown. Thus slope characteristic voltage 341, of the incoming signal 48, is generated after the initial event signal 336. The voltage rate of increase of voltage 341 is determined by the current magnitude I of source 296 and by the capacitance value (Cx) of capacitor Cx. The rate of capacitor voltage increase (dVc) per unit time (dt) defines the slope (dVc/dt) of voltage 341. The well known slope relationship can be written as (dVc/dt)=I/Cx. When voltage 49 exceeds voltage Vf at time Tf7, voltage N|Vtr| exceeds voltage NVF at time Tf7, causing comparator 290 to output an ending event signal 340, at time Tf7. Since voltage NVF is predetermined, voltage Vf is also predetermined. Thus signal 340 occurs when voltage 49 exceeds voltage Vi by a predetermined signal voltage magnitude difference, being (Vf−Vi). Thus signal 340 occurs at the second input of gate 312, and causes base current through resistor 300 to activate transistor 298 to a conductive state. As a result, voltage 341, and thus voltage Vc across capacitor Cx, is discharged, or reset, by transistor 298 to approximately zero volts, at time Tf7. Thus voltage 341 increases for a seventh discriminating time interval Td7=(Tf7−Ti), increasing to a first peak capacitor voltage (Vcp1), at time Tf7. For voltage 49 with slope 332, dVc=Vcp1, and dt=Td7. Thus from the well known slope relationship, voltage Vcp1 can be written as Vcp1=I(Td7)/Cx, for voltage 49 having slope 332. From this analysis, voltage Vcp can be generalized.

In general, voltage Vcp can be written as Vcp=I(Td)/Cx, for a general time interval Td=(Tf−Ti). Thus voltage Vcp is also generally written as Vcp=I(Tf−Ti)/Cx. Since slope Sa is generally written as Sa=(Vf−Vi)/(Tf−Ti), then voltage Vcp=I(Vf−Vi)/Sa(Cx). Since current I, voltages Vf and Vi, and capacitor Cx are predetermined, then voltage Vcp is generally written as Vcp=K/Sa, where K is a predetermined constant. Thus voltage Vcp represents the inverse characteristic slope of voltage |Vtr|, as well as a signal characteristic of voltage |Vtr|. In this embodiment, when slope Sa of voltage |Vtr| is less than slope limit 330, voltage Vcp is greater then voltage Vim. When slope Sa of voltage |Vtr| is greater than slope limit 330, voltage Vcp is less than voltage Vlim. Thus voltage Vlim is provided and represents slope limit 330, as well as a predetermined slope range limit, bounded by limit 330. Slope Sa is within the slope range limit, when slope Sa is less than slope limit 330. For this case, voltage Vcp of voltage Vc is greater than voltage Vlim and represents slope Sa being within the slope range limit. The use of voltage Vcp and voltage Vlim to determine when slope Sa is within the slope range limit will be more clearly understood with the following discussion.

In general, ring signal detection occurs, prior to time 46 and after time Tf, when slope Sa of voltage |Vtr| is less than slope limit 330, during time interval Td. For an example of detecting the first ring signal voltage 48 using slope Sa, assume voltage 49 occurs, having slope 332 as shown. When voltage 49 exceeds voltage Vi at time Ti, comparator 292 detects when voltage N|Vtr| equals or exceeds voltage NVi, and outputs signal 336 at time Ti. After time Ti, voltage Vc begins to increase, generating voltage Vcp as a signal characteristic representation of slope Sa as previously discussed. After a confidence time interval Tc, voltage Vc increases greater than voltage Vlim at time Tf8, since slope 332 is less than maximum slope limit 330. Since voltage Vc is coupled to the positive input of comparator 310, comparator 310 outputs a high logic voltage at the Set (S) input of flip-flop 308, after time interval Tc and at time Tf8. As a result, the Q output of flip-flop 308 provides voltage Vvc, having a valid compare signal 344 at the first input of gate 312, after time interval Tc and at time Tf8. Thus a valid compare signal results, when voltage Vcp is greater than voltage Vlim, which is representative of slope 332 being within the slope range limit, bounded by limit 330. Thus the valid compare signal is generated, in response to voltage representation Vcp being within a predetermined characteristic voltage range limit, bounded by limit Vlim. This can be expressed alternatively, that the valid compare signal is generated, in response to slope Sa being within a predetermined slope range limit, bounded by limit 330. However, gate 312 continues to output signal 346 after time Tf8, since comparator 290 continues to output signal 338 at the second input of gate 312. This results since voltage 49 is less than voltage Vf, or voltage N|Vtr| is less than voltage NVf, after time Tf8. Voltage Vc continues to increase, after time Tf8, until voltage 49 exceeds voltage Vf, causing comparator 290 to output signal 340. Thus signal 340 occurs at the second input of gate 312, when voltage N|Vtr| exceeds voltage NVf at time Tf7 as previously discussed. At time Tf7, voltage Vc reaches peak voltage Vcp1 just before being reset to zero volts by signal 340. Thus the characteristic slope, being represented by voltage Vcp, is terminated in response to the ending event signal 340. Since signals 340 and 344 are both present at the inputs of gate 312 at time Tf7, gate 312 outputs voltage Vrd as a ring detect signal 348 on line 36 at time Tf7. Thus the ring detect signal 348 occurs in response to the valid compare signal 344 and the ending event signal 340, having occurred. In addition, the ring detect signal 348 occurs, during time period 0.25 Tp of voltage 48 and prior to time 46. Time interval Tc is predetermined, but can be chosen to have many predetermined time values.

Time interval Tc is defined by voltage Vf. For example, by decreasing voltage Vf for voltage 50, slope 330 is increased and time interval Tc and voltage Vlim are decreased. By increasing voltage Vf for voltage 50, slope 330 is decreased and time interval Tc and voltage Vlim are increased. In general, an increased voltage Vf increases the confidence level that a valid first ring signal is due to voltage 48, and not due to other line signals. This results since slope representation voltage Vcp is generated over a greater portion of time interval Td7. The function of switch 322 is next discussed.

A reset logic signal at terminal Rrs prevents switch 322 from being activated by signal 348 on line 36. In this case, this third embodiment continues to receive voltage 48. Thus comparator 290 outputs a low logic voltage at the second input of gate 312, when voltage |Vtr| decreases less than voltage Vf, or when voltage N|Vtr| decreases less than voltage NVf. As a result, gate 312 outputs a low logic voltage for voltage Vrd. When voltage |Vtr| decreases less than voltage Vi, voltage N|Vtr| decreases less than voltage NVi, and comparator 292 outputs a high logic voltage, generating the initial reset state as previously discussed. Thus comparator 292 resets voltage Vc to approximately zero volts, and maintains the Q output voltage Vvc of flip-flop 308 to a low logic voltage at the first input of gate 312. Thus gate 312 continues to output a low logic voltage for voltage Vrd. The case when switch 322 in not reset is next discussed.

When signal 348 occurs for voltage Vrd at the control input of switch 322, and switch 322 is not reset, switch 322 is activated to a conductive state, coupling device 324 at terminal 320 to line 24. Thus the off-hook impedance of device 324 is coupled between the Tip and Ring terminals, in response to signal 348, during time period 0.25 Tp and prior to time 46. As previously discussed, the CO recognizes the off-hook condition on line 24 caused by this off-hook impedance, and terminates the ring signal, providing the communication state on line 24. During the communication state, switch 322 provides bi-directional telecommunication signals between line 24 and terminal 320. These bi-directional signals can be received or transmitted from or to line 24, respectively, by other telecommunication devices coupled to terminal 320, or alternatively to port Ptc of device 324. During or after the communication state, a reset signal is coupled to reset terminal Rrs of switch 322, which deactivates switch 322, by uncoupling line 24 from terminal 320. As a result, the off-hook impedance of device 324 is uncoupled from line 24, and bi-directional communications signals are terminated between line 24 and terminal 320. A subsequent valid ring signal voltage, such as voltage 48 in a subsequent alerting state, will cause the third embodiment of FIG. 7 to respond in a ring signal detection cycle, as previously described.

All of the circuit blocks and components shown in FIG. 7 are well known. Comparators 290, 292, and 310 employ 3 comparators from a National Semiconductor's LM339 Quad Comparator. Current source 296 is also well known, with a resistor coupled to a high value of voltage V+ being the most common source of current. All logic components are also well known. The function and method of switch 322 is well known and is described in U.S. Pat. No. 5,920,652 to Davis, Jul. 6, 1999. Switch 322 is a mechanical, or alternatively, an electronic device and is alternatively incorporated into device 324. Device 324 consists of two series connected resistors coupled from terminal 320 to ground 86. The sum of the two series connected resistors is equal to a magnitude of the off-hook impedance. This off-hook impedance includes an impedance as low as substantially zero ohms. Port Ptc is connected to the common resistor series connection. Alternatively, device 324 is an electronic device, such as Motorola's MC34014 Telephone Speech Network with Dialer Interface. All other electronic components are well known. The response of this third embodiment to other line signals on line 24 is next discussed.

Figure 9:
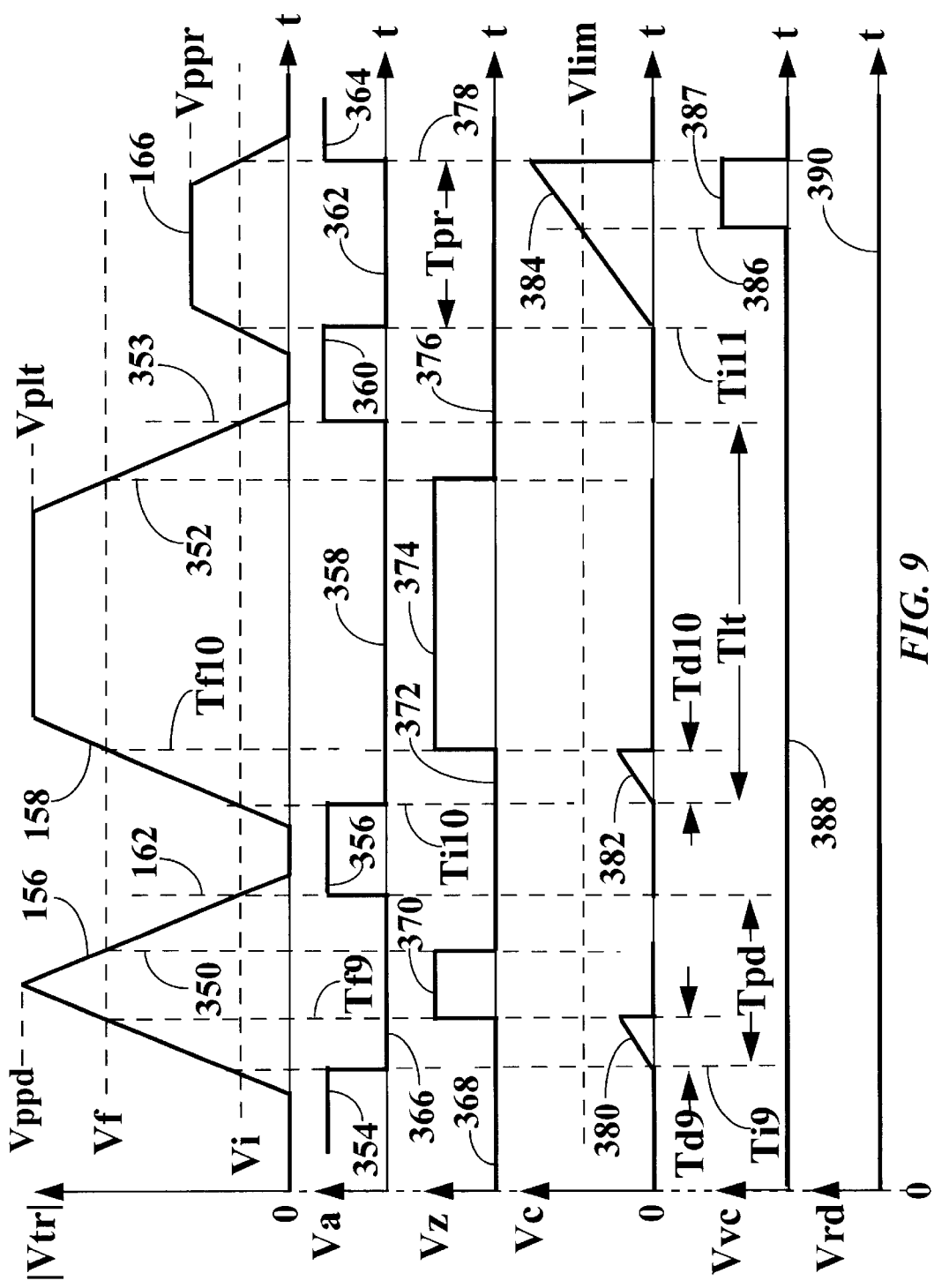
FIG. 9 illustrates a magnitude of other line signal voltages on a telecommunication line. Signal logic waveforms and a capacitor voltage characteristic waveform is shown for the third embodiment of FIG. 7, in response to these other line signals.

FIG. 9 shows voltage magnitude vs. time waveforms of other line signal voltages 156, 158, and 166, as shown in FIG. 4. In addition, FIG. 9 also shows waveforms generated by the third embodiment of FIG. 7, in response to these other line signals. The detector waveforms for logic voltages Va, Vz, Vvc, and Vrd, are for the same electrical function, as described for FIG. 2. The logic signals define a binary low or high logic voltage. Signals 354, 366, 356, 358, 360, 362 and 364 are associated with voltage Va. Signals 368, 370, 372, 374, and 376 are associated with voltage Vz. Signals 387 and 388 are associated with voltages Vvc, and signal 390 is associated with voltage Vrd. The voltage integral characteristic waveforms 380, 382 and 384 are for capacitor voltage Vc as shown. The response of this third embodiment to each of the other line signals is next discussed.

The third embodiment of FIG. 7 is unresponsive to a pulse dialing voltage 156, which is next shown using the waveforms of FIG. 9. Prior to a ninth initial time Ti9, this detector is in the initial reset state, due to a reset signal 354. During the rise time, voltage 156 increases greater than voltage Vi at time Ti9. This causes voltage N|Vtr| to become greater than voltage NVi at time Ti9, causing comparator 292 to output an initial event signal 366. Since signal 366 and a reset signal 368 are both at a low logic voltage, a voltage integral characteristic 380 increases after time Ti9, as shown for voltage Vc. When voltage 156 increases greater than voltage Vf at a ninth final time Tf9, voltage N|Vtr| becomes greater than voltage NVf at time Tf9, causing comparator 290 to output an ending event signal 370. Since time interval Tpd is much less than time period 0.25 Tp, a ninth discriminating time interval Td9=(Tf9−Ti9) is also much less than time period 0.25 Tp. Thus characteristic 380 is reset to approximately zero volts at time Tf9, before characteristic 380 can equal or exceed voltage Vlim. Thus comparator 310 continues to output a low logic voltage at the Set (S) input of flip-flop 308, and a reset signal 388 remains at the first input of gate 312. Thus gate 312 continues to output a reset signal 390, during time interval Td9 and after time Tf9. When voltage 156 decreases less than voltage Vf at a time 350, voltage N|Vtr| decreases less than voltage NVf at time 350, causing comparator 290 to output a reset signal 372. Since signal 372 occurs at the second input of gate 312, gate 312 continues to output signal 390, after time 350. When voltage 156 decreases less than voltage Vi at a time 162, voltage N|Vtr| decreases less than voltage NVi at time 162, causing comparator 292 to output a reset signal 356. Signal 356 causes the detector of FIG. 7 to be in the initial reset state, as previously discussed. Thus the detector of FIG. 7 is unresponsive to a pulse dialing voltage 156.

The third embodiment of FIG. 7 is next shown to be unresponsive to a switched line test voltage 158, using the waveforms of FIG. 9. Prior to a tenth initial time Ti10, this detector is in the initial reset state, due to signal 356. During the rise time, voltage 158 increases greater than voltage Vi, at time Ti10. This causes voltage N|Vtr| to become greater than voltage NVi at time Ti10, causing comparator 292 to output an initial event signal 358. In response, a voltage integral characteristic 382 increases after time Ti10 as shown. When voltage 158 increases greater than voltage Vf at a tenth final time Tf10, voltage N|Vtr| becomes greater than voltage NVf at time Tf10, causing comparator 290 to output an ending event signal 374. For a voltage rise time due to switching of voltage Vplt to line 24, a tenth discriminating time interval Td10=(Tf10−Ti10) is much less than time period 0.25 Tp. Thus characteristic 382 is reset to approximately zero volts at time Tf10, before characteristic 382 can exceed voltage Vlim. Thus comparator 310 continues to output a low logic voltage to the Set (S) input of flip-flop 308, and signal 388 remains at the first input of gate 312. Thus gate 312 continues to output signal 390, during time interval Td10 and after time Tf10. When voltage 158 decreases less than voltage Vf at a time 352, voltage N|Vtr| decreases less than voltage NVf at time 352, causing comparator 290 to output a reset signal 376. Since signal 376 occurs at the second input of gate 312, gate 312 continues to output signal 390, after time 352. When voltage 158 decreases less than voltage Vi at a time 353, voltage N|Vtr| decreases less than voltage NVi at time 353, causing comparator 292 to output a reset signal 360. Signal 360 causes the detector of FIG. 7 to be in the initial reset state, as previously discussed. Thus the detector of FIG. 7 is unresponsive to a switched line test voltage 158.

The third embodiment of FIG. 7 is also unresponsive to a slowly increasing line test voltage 158. When voltage Vtr results from a slowly increasing line test voltage, the high pass filter associated with capacitor Cs and resistors Rs, R1 and R2 will significantly attenuate voltage N|Vtr|. This will result, when the increase in voltage 158 is much slower than time period 0.25 Tp. As a result, voltage N|Vtr| may exceed voltage NVi, but will not exceed voltage NVf. When voltage N|Vtr| does not exceed voltage NVi, the detector of FIG. 7 remains in the initial reset state. When voltage N|Vtr| exceeds voltage NVi, but not voltage NVf, voltage Vc will increase due to the initial event signal and may exceed voltage limit Vlim (not shown). In this case, comparator 310 outputs a high logic voltage to the Set (S) input of flip-flop 308, which outputs a high logic voltage to the first input of gate 312. However, since voltage N|Vtr| does not exceed voltage NVf, comparator 290 continues to output a low logic voltage to the second input of gate 312. Thus gate 312 continues to output signal 390, during a slowly increasing voltage 158. Thus the detector of FIG. 7 is unresponsive to a slowly increasing line test voltage 158.

The third embodiment of FIG. 7 is also unresponsive to voltage 166. Prior to an eleventh initial time Ti11, this detector is in the initial reset state, due to signal 360. During the rise time, voltage 166 increases greater than voltage Vi, at time Ti11. This causes voltage N|Vtr| to become greater than voltage NVi at time Ti11, and causes comparator 292 to output an initial event signal 362, at time Ti11. In response, a voltage integral characteristic 384 increases after time Ti11, as shown for voltage Vc. However, since voltage Vppr is less than voltage Vf, voltage |Vtr| will not exceed voltage Vf, and voltage N|Vtr| will not exceed voltage NVf. Thus the voltage of characteristic 384 will continue to increase, and may exceed limit voltage Vlim at a time 386 as shown. In this case, comparator 310 outputs a high logic voltage to the Set (S) input of flip-flop 308, which outputs a valid compare signal 387 at the first input of gate 312. However, since voltage N|Vtr| does not exceed voltage NVf, comparator 290 continues to output signal 376 at the second input of gate 312. Thus gate 312 continues to output signal 390, during time interval Tpr of voltage 166. When voltage 166 decreases less than voltage Vi at a time 378, voltage N|Vtr| decreases less than voltage NVi at time 378, causing comparator 292 to output a reset signal 364. Signal 364 causes the detector of FIG. 7 to be in the initial reset state, as previously discussed. Thus the detector of FIG. 7 is unresponsive to a pre-ring line test voltage 166.

In summary, the third embodiment of the detector shown in FIG. 7 is responsive to voltage 48 on line 24, by providing the ring detect signal, during the first time period 0.25 Tp and prior to time 46. However, this third embodiment of FIG. 7 is unresponsive to other line signal voltages on line 24. Specifically, the detector of FIG. 7 does not generate the ring detect signal, when voltages 156, 158, and 166 are present on line 24. Thus the third embodiment shown in FIG. 7 discriminates other line signals from the first ring signal on line 24.

It should be apparent from the foregoing discussion, that a novel telephone ring signal detector has been provided, for detecting a first telephone ring signal on a telecommunication line, yet discriminates the first telephone ring signal from other line signals on the line. The ring signal detector is unresponsive to pulse dialing voltages, routine maintenance line test voltages, and pre-ring line test voltages on the line. The ring signal detector is responsive only to the first telephone ring signal voltage, which is detected during a first quarter cycle time period of the first telephone ring signal on the line. As a second aspect of the invention, an off-hook terminal impedance is coupled to the line, providing an off-hook condition on the line, during the first quarter cycle time period of the first ring signal. The Central Telephone Office electrically recognizes the off-hook condition, and terminates the ring signal voltage before it gains sufficient magnitude or energy to activate any telephone ringer mechanisms associated with telephone devices connectable to the line. After the off-hook impedance is coupled to the line, telecommunication signals can be received from the line or transmitted to the line through the detector.

While the invention has been described in the context of three preferred embodiments, it will be apparent to those skilled in the art that the present invention may be modified in numerous ways and may assume many embodiments other than those specifically set out and described above. Although many changes to the preferred embodiments of the present invention are obvious to anyone skilled in the art, these and other similar changes do not alter the intended spirit and scope of the present invention.

Accordingly it is intended by the appended claims to cover all modifications of the invention, rather then just the preferred embodiments provided, which fall within the true spirit and scope of the invention.

I claim:

1. A method of detecting a first telephone ring signal on a telecommunication line, and discriminating said first telephone ring signal from other line signals on said telecommunication line comprising the steps of:
   receiving an incoming signal from said telecommunication line;
   generating an initial event signal in response to detecting said incoming signal;
   generating a signal characteristic of said incoming signal, after said initial event signal;
   providing a predetermined signal characteristic range limit of said first telephone ring signal;
   comparing said signal characteristic with said predetermined signal characteristic range limit;
   generating a valid compare signal in response to said signal characteristic being within said predetermined signal characteristic range limit;
   generating an ending event signal after said initial event signal; and
   generating a ring detect signal during a first quarter cycle time period of said first telephone ring signal in response to said valid compare signal and said ending event signal having occurred.

2. A method of detecting a first telephone ring signal according to claim 1 further comprising the step of:
   coupling an off-hook terminal impedance to said telecommunication line in response to said ring detect signal, wherein an off-hook condition is provided on said telecommunication line, during said first quarter cycle time period of said first telephone ring signal.

3. A method of detecting a first telephone ring signal according to claim 1, wherein said initial event signal is generated when a signal magnitude of said incoming signal is a predetermined signal magnitude.

4. A method of detecting a first telephone ring signal according to claim 1, wherein said signal characteristic is an integral representation of said incoming signal.

5. A method of detecting a first telephone ring signal according to claim 1, wherein said signal characteristic is a derivative representation of said incoming signal.

6. A method of detecting a first telephone ring signal according to claim 1, wherein said signal characteristic is a slope representation of said incoming signal.

7. A method of detecting a first telephone ring signal according to claim 1, wherein said signal characteristic is a voltage representation of said incoming signal.

8. A method of detecting a first telephone ring signal according to claim 3, wherein said ending event signal is generated when said signal magnitude of said incoming signal is greater than said predetermined signal magnitude, by a predetermined signal magnitude difference.

9. A method of detecting a first telephone ring signal according to claim 1, wherein said ending event signal is generated when a predetermined time interval has elapsed from when said initial event signal having occurred.

10. A method of detecting a first telephone ring signal according to claim 1, further comprising the step of:
    terminating said signal characteristic in response to said ending event signal.

11. A telephone ring signal detector coupled to a telecommunication line, for detecting a first telephone ring signal on said telecommunication line, and discriminating said first telephone ring signal from other line signals on said telecommunication line comprising:
    an event generator coupled to said telecommunication line for receiving an incoming signal, and generating an initial event signal and an ending event signal;
    a signal characteristic generator coupled to said telecommunication line and to said event generator for generating a signal characteristic of said incoming signal after said initial event signal;
    a signal characteristic limit device for generating a predetermined signal characteristic range limit of said first telephone ring signal; and
    a signal characteristic comparator coupled to said signal characteristic generator, to said signal characteristic limit device and to said event generator for comparing said signal characteristic with said predetermined signal characteristic range limit;
    wherein said signal characteristic comparator generates a valid compare signal in response to said signal characteristic being within said predetermined signal characteristic range limit; wherein said signal characteristic comparator generates a ring detect signal during said first quarter cycle time period of said first telephone ring signal in response to said valid compare signal and said ending event signal having occurred.

12. A telephone ring signal detector according to claim 11 further comprising:
    a line impedance device for providing an off-hook terminal impedance and coupled to said telecommunication line and to said signal characteristic comparator for coupling said off-hook terminal impedance to said telecommunication line in response to said ring detect signal,
    wherein an off-hook condition on said telecommunication line occurs during said first quarter cycle time period of said first telephone ring signal.

13. A telephone ring signal detector according to claim 11, wherein said initial event signal is generated when a signal magnitude of said incoming signal is at a predetermined signal magnitude.

14. A telephone ring signal detector according to claim 11, wherein said signal characteristic is an integral representation of said incoming signal.

15. A telephone ring signal detector according to claim 11, wherein said signal characteristic is a derivative representation of said incoming signal.

16. A telephone ring signal detector according to claim 11, wherein said signal characteristic is a slope representation of said incoming signal.

17. A telephone ring signal detector according to claim 11, wherein said signal characteristic is a voltage representation of said incoming signal.

18. A telephone ring signal detector according to claim 13, wherein said ending event signal is generated when said signal magnitude of said incoming signal is greater than said predetermined signal magnitude, by a predetermined signal magnitude difference.

19. A telephone ring signal detector according to claim 11, wherein said ending event signal is generated when a predetermined time interval has elapsed from when said initial event signal is present.

20. A telephone ring signal detector according to claim 11, wherein said signal characteristic is terminated in response to said ending event signal.

* * * * *